(12) United States Patent
Nagashima et al.

(10) Patent No.: US 7,225,457 B2
(45) Date of Patent: May 29, 2007

(54) INFORMATION SUPPLY APPARATUS, INFORMATION UTILIZATION APPARATUS, INFORMATION MANIPULATION APPARATUS, INFORMATION SUPPLY SYSTEM, INFORMATION SUPPLY METHOD, INFORMATION UTILIZATION METHOD AND RECORDING MEDIUM

(75) Inventors: Toshimichi Nagashima, Tokyo (JP); Keiichi Totsuka, Tokyo (JP); Yukinari Takashima, Kanagawa (JP)

(73) Assignee: Sony Corporation, Tokyo (JP)

( * ) Notice: Subject to any disclaimer, the term of this patent is extended or adjusted under 35 U.S.C. 154(b) by 663 days.

(21) Appl. No.: 09/746,054

(22) Filed: Dec. 21, 2000

(65) Prior Publication Data

US 2001/0014971 A1  Aug. 16, 2001

(30) Foreign Application Priority Data

Dec. 22, 1999  (JP) ............................. 11-364738

(51) Int. Cl.
*G06F 3/00* (2006.01)
*G06F 13/00* (2006.01)
*H04N 5/445* (2006.01)
*H04N 7/16* (2006.01)

(52) U.S. Cl. ..................... 725/53; 725/46; 725/139; 348/563

(58) Field of Classification Search .............. 725/53, 725/46, 32, 34, 35, 139, 141, 47; 348/563
See application file for complete search history.

(56) References Cited

U.S. PATENT DOCUMENTS

| | | | | |
|---|---|---|---|---|
| 5,666,645 A | * | 9/1997 | Thomas et al. | 725/47 |
| 5,847,703 A | * | 12/1998 | Teicher et al. | 725/56 |
| 5,880,720 A | * | 3/1999 | Iwafune et al. | 725/24 |
| 5,945,987 A | * | 8/1999 | Dunn | 345/718 |
| 6,005,631 A | * | 12/1999 | Anderson et al. | 725/53 |
| 6,216,264 B1 | * | 4/2001 | Maze et al. | 725/53 |
| 6,449,654 B1 | * | 9/2002 | Blackwell et al. | 709/232 |
| 6,553,178 B2 | * | 4/2003 | Abecassis | 386/83 |
| 6,631,523 B1 | * | 10/2003 | Matthews et al. | 725/53 |
| 6,898,762 B2 | * | 5/2005 | Ellis et al. | 715/716 |
| 2003/0056208 A1 | * | 3/2003 | Kamada et al. | 725/9 |
| 2003/0135853 A1 | * | 7/2003 | Goldman et al. | 725/34 |
| 2003/0135864 A1 | * | 7/2003 | Barth | 725/100 |

* cited by examiner

*Primary Examiner*—Chris Kelley
*Assistant Examiner*—Joseph G. Ustaris
(74) *Attorney, Agent, or Firm*—Frommer Lawrence & Haug LLP; William S. Frommer; Thomas F. Presson

(57) ABSTRACT

Apparatus and method for facilitating selection of viewable programs by allowing a user to recognize recorded program contents in a relatively short period of time. The apparatus and method provides to a user broadcasting contents summary information obtained by summarizing the broadcasting contents information.

27 Claims, 12 Drawing Sheets

FIG. 8

| Title | Genre | Recording Date | Recording Time |
|---|---|---|---|
| News S | Press Information | 10/04 | 1:20:00 |
| Professional Baseball Jinkyo VS Hamayoko | Sport | 10/04 | 2:19:00 |
| Foreign Film Theater | Movie | 10/03 | 2:22:00 |
| | | | |

40c Scroll Button

40b Selection Button — Select

40a Detail Button — Detail

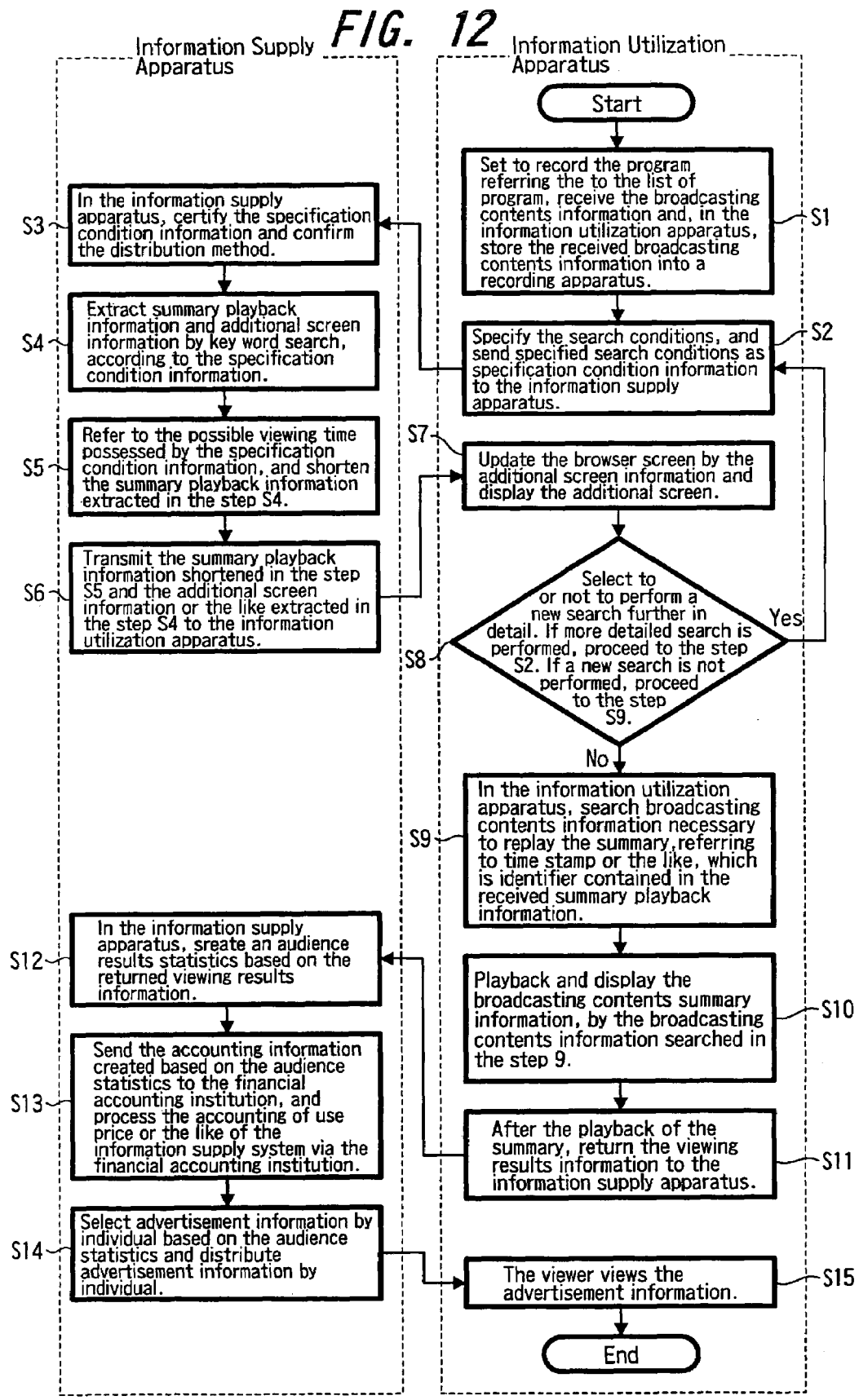

INFORMATION SUPPLY APPARATUS, INFORMATION UTILIZATION APPARATUS, INFORMATION MANIPULATION APPARATUS, INFORMATION SUPPLY SYSTEM, INFORMATION SUPPLY METHOD, INFORMATION UTILIZATION METHOD AND RECORDING MEDIUM

BACKGROUND OF THE INVENTION

1. Field of the Invention

The present invention relates to an information supply apparatus for supplying broadcasting contents summary information obtained by summarizing broadcasting contents information, information utilization apparatus, information manipulation apparatus, information supply system, information supply method, information utilization method and recording medium and, especially, to an information supply apparatus for supplying broadcasting contents summary information responding to a user selection, information utilization apparatus, information manipulation apparatus, information supply system, information supply method, information utilization method and recording medium.

2. Description of the Related Art

In general, one of broadcasting programs supplied to a home is performed through a viewer's channel change. Or a view browses a broadcasting program list in the newspaper or the like to select a favorite program and view the same. When a viewer wants to view two or more programs on different channels at the same time, the program contents which can not be viewed at that time are often recorded on videotape, recording apparatus or the like, and the recorded programs are viewed thereafter. Moreover, when a viewer can not view his/her interesting broadcasting program at that time, such a method is often employed that a reservation for recording the broadcasting program contents is set in advance, the program is recorded automatically, and the program is viewed by reproducing the recorded contents afterward is also adopted.

However, in a conventional program recording method, there is a problem that it is impossible to know the recorded contents before actually viewing the recorded program contents, and it is difficult to select a program to view.

In recent years, the number of programs that can be received by the home is increasing exponentially according to the diversification of broadcasting media and the implementation of digital broadcasting such as satellite digital broadcasting. Thus, when the number of programs that can be viewed increases, occasions to record program contents and to view their contents are believed to increase all the more. However, at the same time, it becomes important which program to select and view among many and various broadcasting programs. In the conventional method, the information concerning the program is only known by viewing actually the program, except mere information described in a program list, or the like. Consequently, in the future, in a situation of predicted further proliferation of received programs, it will be more and more difficult to select and view a program a viewer really wants, in a limited viewable time.

In addition, in the conventional method, there is a problem it is impossible to collect personal information indicating which program a viewer actually viewed.

Conventionally, the personal information indicating which program the viewer actually viewed has only been collected by interview or the like, and it has been impossible to collect the personal information of respective viewers and supply services appropriate for each viewer, based on the statistic information thereof.

SUMMARY OF THE INVENTION

The present invention has been made in view of these problems and has an object to provide an information supply apparatus which can facilitate selection of a program to view by allowing a viewer to recognize recorded program contents in a short period of time, and can collect or recover personal information of viewers who view a program.

Another object of the present invention is to provide an information utilization apparatus which can facilitate selection of a program to view by allowing a viewer to recognize recorded program contents in a short period of time, and can supply the personal information of viewers who view a program.

Still another object of the present invention is to provide an information manipulation apparatus which can facilitate selection of a program to view by allowing a viewer to recognize recorded program contents in a short period of time.

Moreover, another object of the present invention is to provide an information supply system which can facilitate selection of a program to view by allowing a viewer to recognize recorded program contents in a short period of time, and can collect personal information of viewers who view a program.

Still another object of the present invention is to provide an information supply method which can facilitate selection of the program to view by allowing a viewer to recognize the recorded program contents in a short period of time, and can collect personal information of viewers who view a program.

Moreover, another object of the present invention is to provide an information utilization method which can facilitate selection of a program to view by allowing a viewer to recognize recorded program contents in a short period of time, and can supply personal information of viewers who view a program.

Still another object of the present invention is to provide a recording medium which stores a program which causes a computer to execute functions capable of facilitating selection of a program to view by allowing a viewer to recognize recorded program contents in a short period of time and can collect personal information of viewers who view a program.

In order to solve the aforementioned problems, the present invention provides an information supply apparatus for supplying broadcasting contents summary information obtained by summarizing the broadcasting contents information, comprising summary playback information storage means for storing summary playback information representing summary contents of the broadcasting contents information, additional screen information storage means for storing additional screen information created in correspondence to the summary playback information, summary playback information search means for extracting specific summary playback information from the summary playback information storage means according to a transmitted specified condition information, additional screen information extraction means for extracting the additional screen information corresponding to the summary playback information extracted by the summary playback information search means, from the additional screen information storage means, summary contents shortening means for compressing the summary playback information extracted by the summary playback information search means according to the specified condition information, and summary playback distribution means for distributing the additional screen information extracted by the additional screen information storage means and the summary playback information shortened by the summary contents shortening means at a timing specified by the specified condition information.

Here, the summary playback information storage means stores summary playback information representing summary contents of the broadcasting contents information, the additional screen information storage means stores additional screen information created in correspondence to the summary playback information, the summary playback information search means extracts the specific summary playback information from the summary playback information storage means according to a transmitted specified condition information, the additional screen information extraction means extracts the additional screen information corresponding to the summary playback information extracted by the summary playback information search means, from the additional screen information storage means, the summary contents shortening means shortens the summary playback information extracted by the summary playback information search means according to the specified condition information, and the summary playback distribution means for distributes the additional screen information extracted by the additional screen information storage means, and the summary playback information shortened by the summary contents shortening means at a timing specified by the specified condition information.

Also, an information supply apparatus, further comprising viewing results collection means for collecting viewing results information indicating that the summary of broadcasted contents has been reproduced, and a client management means for creating viewing statistic information, statistics of the viewing results information, and managing the client, is provided.

Here, the viewing results collection means collects viewing results information indicating that the summary of broadcasted contents has been reproduced, and the client management means creates viewing statistic information, statistics of the viewing results information, and manages the client.

Moreover, an information utilization apparatus for using broadcasting contents summary information obtained by summarizing the broadcasting contents information, comprising broadcasting contents information storage means for storing the broadcasting contents information, specified condition input means for inputting specified condition information of the broadcasting contents information desired to be supplied, specified condition information transmission means for transmitting the specified condition information, summary related information reception means for receiving summary playback information representing the summary of the broadcasting contents information distributed according to the specified condition information, additional screen display means for displaying the additional screen, using the additional screen information received by the summary related information reception means, frame search means for extracting a frame composing the broadcasting contents information, from the broadcasting contents information stored in the broadcasting contents information storage means, using the summary playback information received by the summary related information reception means, and image playback means for reproducing the frame extracted by the frame search means, is supplied.

Here, the broadcasting contents information storage means stores the broadcasting contents information, the specified condition input means inputs specified condition information of the broadcasting contents information desired to be supplied, the specified condition information transmission means transmits the specified condition information, the summary related information reception means receives summary playback information representing the summary of the broadcasting contents information distributed according to the specified condition information, the additional screen display means displays the additional screen, using the additional screen information received by the summary related information reception means, the frame search means extracts a frame composing the broadcasting contents information, from the broadcasting contents information stored in the broadcasting contents information storage means, using the summary playback information received by the summary related information reception means, and the image playback means reproduces the frame extracted by the frame search means.

Also, an information utilization apparatus, further comprising viewing results information return means for returning the viewing results information indicating that the broadcasting contents summary information is reproduced by the image playback means to the supplier of the broadcasting contents summary information, is supplied.

Here, the viewing results information return means returns the viewing results information indicating that the broadcasting contents summary information is reproduced by the image playback means to the supplier of the broadcasting If contents summary information.

And, an information manipulation apparatus comprising broadcasting contents information storage means for storing the broadcasting contents information classified by broadcasting contents, a information processing server for storing template information for processing the broadcasting contents information, a material information accumulation server for extracting and dividing the broadcasting contents information stored in the broadcasting contents information storage means and the template information stored in the information processing server, and information processing means for creating the summary playback information using the broadcasting contents information and the template information divided by the material information accumulation server, is provided.

Here, the broadcasting contents information storage means stores the broadcasting contents information classified by broadcasting contents, the information processing server stores template information for processing the broadcasting contents information, the material information accumulation server extracts and divides the broadcasting contents information stored in the broadcasting contents information storage means and the template information stored in the information processing server, and the information processing means creates the summary playback information using the broadcasting contents information and the template information divided by the material information accumulation server.

Also, an information supply system for supplying broadcasting contents summary information obtained by summarizing the broadcasting contents information, including an information supply apparatus comprising summary playback information storage means for storing summary playback information representing summary contents of the broadcasting contents information, additional screen information storage means for storing additional screen information created in correspondence to the summary playback information, summary playback information search means for extracting the specific summary playback information from the summary playback information storage means according to a transmitted specified condition information, additional screen information extraction means for extracting the additional screen information corresponding to the summary playback information extracted by the summary playback information search means, from the additional screen information storage means, summary contents shortening means for compressing the summary playback information extracted by the summary playback information search means according to the specified condition information, and summary playback distribution means for distributing the additional screen information extracted by the additional screen information storage means, and the summary playback information shortened by the summary contents shortening means at a timing specified by the specified condition information, and an information utilization apparatus, comprising broadcasting contents information storage means for storing the broadcasting contents information, specified condition input means for inputting specified condition information of the broadcasting contents information desired to be provided, specified condition information transmission means for transmitting the specified condition information, summary related information reception means for receiving summary playback information representing the summary of the broadcasting contents information distributed according to the specified condition information, additional screen display means for displaying the additional screen, using the additional screen information received by the summary related information reception means, frame search means for extracting a frame composing the broadcasting contents information, from the broadcasting contents information stored in the broadcasting contents information storage means, using the summary playback information received by the summary related information reception means, and image playback means for reproducing the frame extracted by the frame search means, is provided.

Here, the summary playback information storage means stores summary playback information representing summary contents of the broadcasting contents information, the additional screen information storage means stores additional screen information created in correspondence to the summary playback information, the summary playback information search means extracts the specific summary playback information from the summary playback information storage means according to a transmitted specified condition information, the additional screen information extraction means extracts the additional screen information corresponding to the summary playback information extracted by the summary playback information search means, from the additional screen information storage means, the summary contents shortening means compresses the summary playback information extracted by the summary playback information search means according to the specified condition information, and the summary playback distribution means for distributing the additional screen information extracted by the additional screen information storage means, and the summary playback information shortened by the summary contents shortening means at a timing specified by the specified condition information, the broadcasting contents information storage means stores the broadcasting contents information, the specified condition input means inputs specified condition information of the broadcasting contents information desired to be supplied, the specified condition information transmission means transmits the specified condition information, the summary related information reception means receives summary playback information representing the summary of the broadcasting contents information distributed according to the specified condition information, the additional screen display means for displaying the additional screen, using the additional screen information received by the summary related information reception means, the frame search means extracts a frame composing the broadcasting contents information, from the broadcasting contents information stored in the broadcasting contents information storage means, using the summary playback information received by the summary related information reception means, the image playback means for reproducing the frame extracted by the frame search means.

Further, an information supply method for supplying broadcasting contents summary information obtained by summarizing the broadcasting contents information, comprising steps of storing summary playback information storage means representing summary contents of the broadcasting contents information, storing additional screen information created in correspondence to the summary playback information, extracting the specific summary playback information according to a transmitted specified condition information, extracting the additional screen information corresponding to the extracted summary playback information extracted, shortening the extracted summary playback information according to the specified condition information, and distributing the extracted additional screen information and the shortened summary playback information at a timing specified by the specified condition information, is provided.

Thus, it becomes possible to create the summary of broadcasting contents information under the conditions specified by the viewer, and know the outline of the program contents.

Moreover, an information utilization method for using broadcasting contents summary information obtained by summarizing the broadcasting contents information, comprising steps of storing the broadcasting contents information, inputting the specified condition information of the broadcasting contents information desired to be supplied, transmitting the specified condition information, receiving the distributed summary playback information and the additional screen information, displaying the additional screen, using the received additional screen information, extracting a frame composing the broadcasting contents information, from the stored broadcasting contents information, using the received summary playback information, and reproducing the extracted frame, is provided.

Thus, it becomes possible to replay the summary of broadcasting contents information under the conditions specified by the viewer, and know the outline of the program contents.

Moreover, a recording means storing a program to perform by a computer functions of storing summary playback information storage means representing summary contents of broadcasting contents information, storing additional screen information created in correspondence to the summary playback information, extracting the specific summary playback information according to a transmitted specified condition information, extracting the additional screen information corresponding to the extracted summary playback information, shortening the extracted summary playback information according to the specified condition information, and distributing the extracted additional screen information and the shortened summary playback information at a timing specified by the specified condition information, is provided.

Thus, it becomes possible to create the summary of broadcasting contents information under the conditions specified by the viewer, and supply the viewer with the same by making a computer execute the program stored in this recording medium.

Moreover, a recording means storing a program to perform by a computer functions of storing broadcasting contents information, inputting the specified condition information of the broadcasting contents information desired to be supplied, transmitting the specified condition information, receiving the distributed summary playback information and the additional screen information, displaying the additional screen, using the received additional screen information, extracting a frame composing the broadcasting contents information, from the stored broadcasting contents information, using the received summary playback information, and reproducing the extracted frame, is provided.

Thus, it becomes possible to replay the summary of broadcasting contents information under the conditions specified by the viewer, and know the outline of the program contents by making a computer execute the program stored in this recording medium.

BRIEF DESCRIPTION OF THE DRAWINGS

FIG. 8 is a display screen example displayed on the display apparatus when the specified condition information is input;

FIG. 12 is a flow chart showing the operation of the information supply system.

DETAILED DESCRIPTION OF THE PREFERRED EMBODIMENT

Now, embodiments of the present invention will be described referring to drawings.

Figure 1:
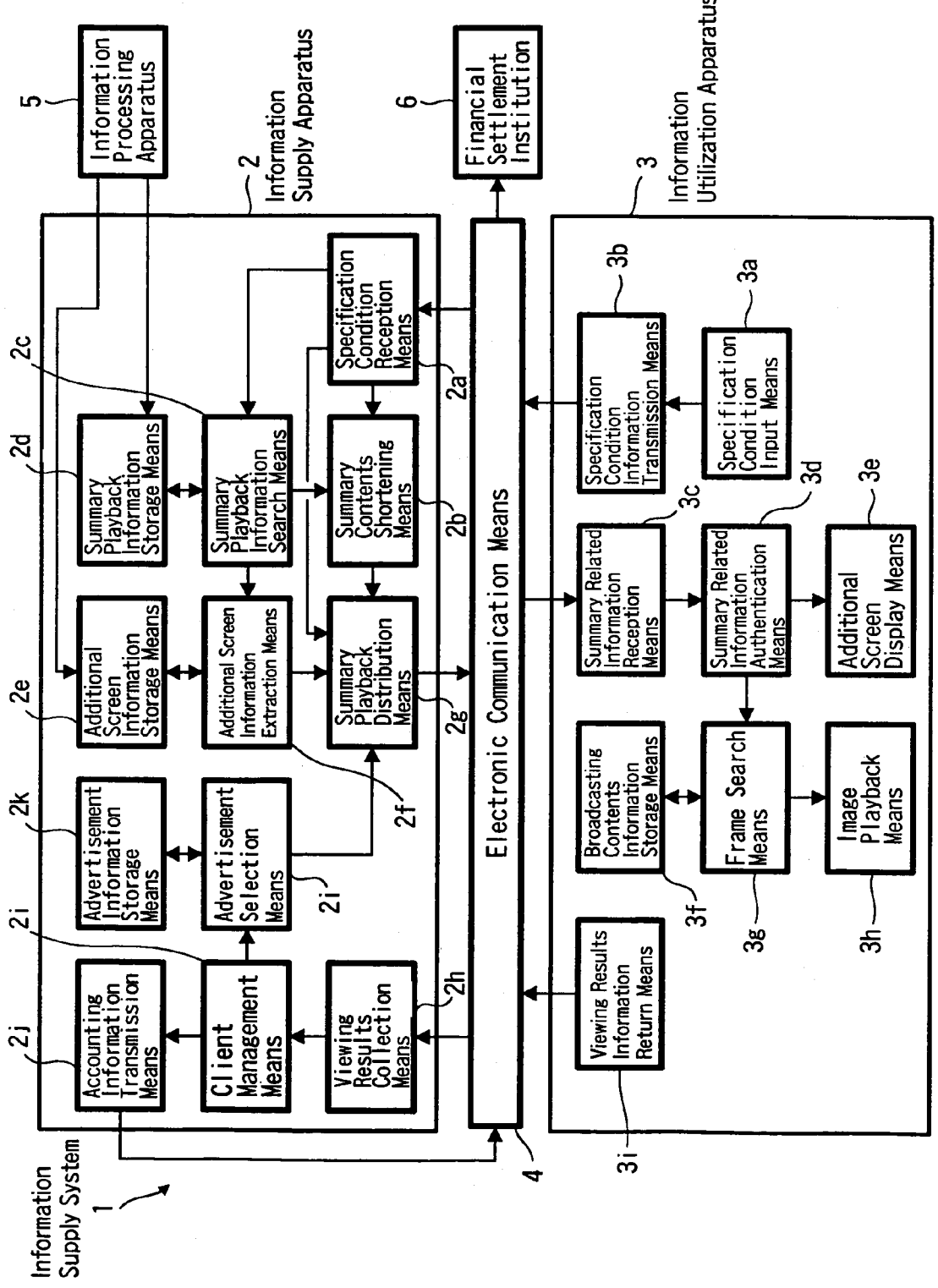
FIG. 1 is a composition drawing showing the composition of the information supply system.

FIG. 1 is a composition drawing showing the composition of an information supply system 1 of this invention.

The information supply system 1 comprises an information supply apparatus 2 for supplying broadcasting contents summary information obtained by summarizing the broadcasting contents information, an information utilization apparatus 3 for using the broadcasting contents summary information, an electronic communication means 4 for transmitting various information, an information manipulation apparatus 5 for creating summary playback information indicating the summary contents of the broadcasting contents information, and a financial settlement institution 6 for settling the use price concerning the use of the information supply system 1.

Here, the information supply apparatus 2 is possessed by an enterprise or the like providing the information supply system 1 and installed as one of jointly owned facilities used in common by viewers, and the information utilization apparatus 3 is possessed by the viewer using the information supply system 1 and installed in the house of viewer, or elsewhere. And, the broadcasting contents information means image information or the like of the program itself broadcasted from a broadcasting station, and is composed of a plurality of headers and frames. The detail thereof will be described below.

The information supply apparatus 2 is composed of a specified condition reception means 2a for receiving specified condition information sent from the information utilization apparatus 3, summary playback information storage means 2d for storing summary playback information representing the summary contents of the broadcasting contents information, additional screen information storage means 2e for storing additional screen information created in correspondence to the summary playback information, summary playback information search means 2c for extracting a particular summary replay information from the summary playback information storage means 2d according to the transmitted specified condition information, additional screen information extraction means 2f for extracting the additional screen information corresponding to the summary playback information extracted by the summary playback information search means 2c, from the additional screen information storage means 2e, summary contents shortening means 2b for compressing the summary playback information extracted by the summary playback information search means 2c according to the specified condition information, summary playback distribution means 2g for distributing the additional screen information extracted by the additional screen information storage means 2f, and the summary playback information shortened by the summary contents shortening means 2b at a timing specified by the specified condition information, viewing results collection means 2h for collecting viewing results information indicating that the summary of broadcasted contents has been reproduced, a client management means 2i for creating viewing statistic information, statistics of the viewing results information, and managing the client, an accounting information transmission means 2j for transmitting accounting information to the financial settlement institution 6, advertisement information storage means 2k for storing advertisement information to be supplied to the user, and advertisement selection means 21 for extracting personal advertisement information selected by user from the advertisement information storage means 2k.

Here, the specified condition information is information indicating creation conditions, distribution conditions or the like of broadcasting contents summary information the viewers desires to be provided, input by the viewer using the information utilization apparatus 3 and transmitted to the information supply apparatus 2. The detail thereof will be described below. The summary playback information is an identifier for specifying the broadcasting contents summary information, composed of a frame number of the frame composing the broadcasting contents summary information and information concerning the broadcasting time when that frame was broadcasted. The detail thereof will be described below. The additional screen information is one of information sent from the information supply apparatus 2 to the information utilization apparatus 3, and the information utilization apparatus 3 displays a search screen for inputting summary creation conditions, or others based on this information. The detail thereof will be described below. The accounting information is the use price information of the information supply system 1 managed for respective viewer. The personal advertisement information is the advertisement information selected based on personal taste, or the like.

The information utilization apparatus 3 comprises broadcasting contents information storage means 3f for storing the broadcasting contents information, specified condition input means 3a for inputting specified condition information of the broadcasting contents information desired to be supplied, specified condition information transmission means 3b for transmitting the specified condition information, summary related information reception means 3c for receiving summary playback information representing the summary of the broadcasting contents information distributed according to the specified condition information, summary related information certification means 3d for certifying received additional screen information and summary playback information, additional screen display means 3e for displaying the additional screen, using the additional screen information received by the summary related information reception means 3c, frame search means 3g for extracting a frame composing the broadcasting contents information, from the broadcasting contents information stored in the broadcasting contents information storage means 3f, using the summary playback information received by the summary related information reception means 3c, image playback means 3h for reproducing the frame extracted by the frame search means 3g, and viewing results information return means 3i for returning the viewing results information indicating that the broadcasting contents summary information is reproduced by the image playback means 3h to the supplier of the broadcasting contents summary information.

The electronic communication means 4 is an electronic communication network such as Internet, allowing information communication between the information utilization apparatus 3 and the financial accounting institution 6.

The information manipulation apparatus 5 processes the broadcasting contents information to create the summary playback information, and also, creates an additional screen information corresponding to the same.

The financial accounting institution 6 settles the use price of the information supply system 1, based on accounting information sent from the information supply apparatus 2.

Figure 2:
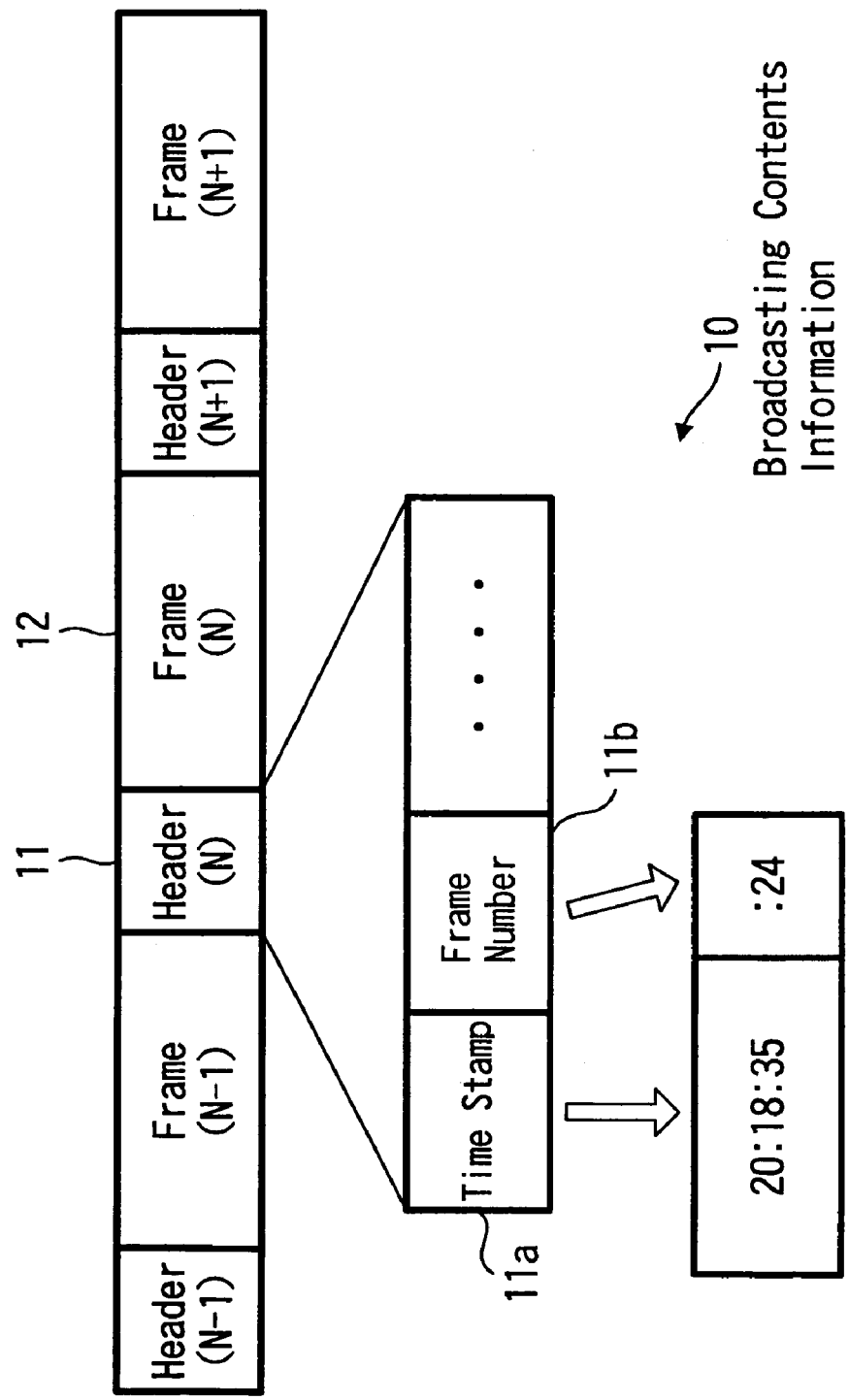
FIG. 2 shows the detailed composition of broadcasting contents information.

FIG. 2 shows the detail composition of the broadcasting contents information 10.

The broadcasting contents information 10 is composed of a plurality of headers 11 indicating the attributed of the recorded information, and a plurality of frames 12 that are image information of the like corresponding respective header 11. The header 11 comprises a time stamps 11a indicating the broadcasting time of the corresponding frame 12, and a frame number 11b indicating the position of this frame 12 in the broadcasting contents information 10. In case of header 11 in FIG. 2, the time stamps 11a is "20:18:35" and the frame number 11b, ":24" meaning that the frame 12 corresponding to the header 11 is the 24th frame broadcasted at twenty-eighteen, 35 secounds.

Figure 3:
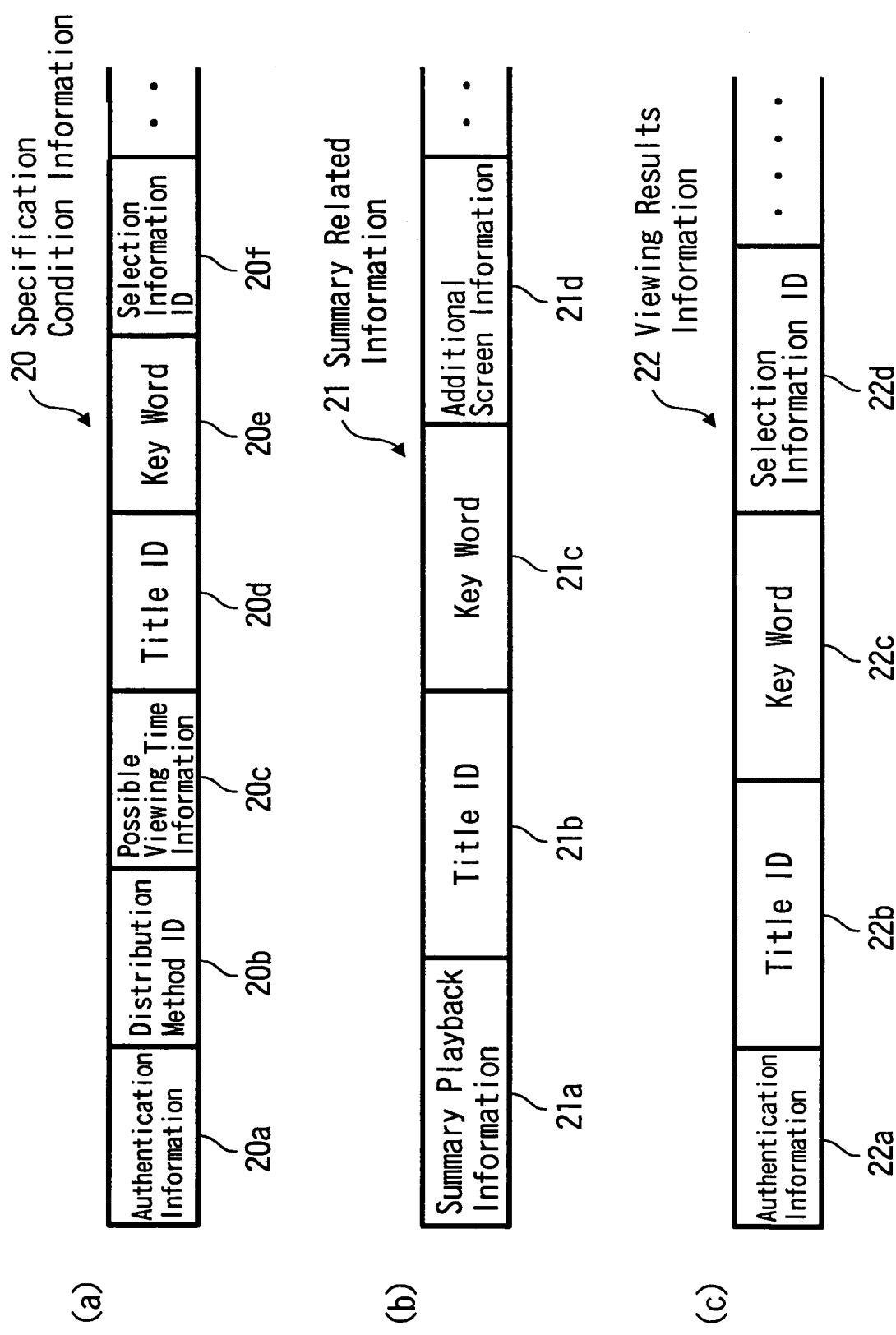
FIG. 3 shows the detail of the information exchanged between the information supply apparatus and the information utilization apparatus.

FIG. 3 is a diagram showing the detail of information exchanged between the information supply apparatus 2 and the information utilization apparatus 3. Here, FIG. 3(a) shows the composition of the specified condition information 20, (b) the composition the summary related information 21 and (c) the composition of the viewing results information 22.

The specified condition information 20 comprises a certification information 20a for certifying the viewer or the information utilization apparatus 3, a distribution method ID 20b indicating the distribution method specified by the viewer, a viewable time information 20c indicating the length of viewable time of the summary by the viewer specified by the viewer, a title ID 20d specifying the broadcasting unit meaning the program or the like, a keyword 20e specified by the viewer to specify the broadcasting contents summary information the viewer desires to be supplied, and a selection information ID 20f indicating the summary contents selected by the viewer. Here, the distribution method means the timing to distribute summary playback information from the information supply apparatus 2 to the information utilization apparatus 3, namely to distribute at the time when the specified condition information 20 is sent from the information utilization apparatus 3 to the information supply apparatus 2, to distribute at daily fixed time, to distribute at the distribution possible time, or the like, and the distribution method ID 20b indicates any one timing selected among them. The summary related information 21 in information distributed by the information supply apparatus 2 to the information utilization apparatus 3 according to the specified condition information 20 transmitted form the information utilization apparatus 3, and the viewer views the summary, selects the detail of summary, or the like using this information. The summary related information 21 includes summary playback information 21a, title ID 21b, keyword 21c and additional screen information 21d. Here, the summary playback information 21a is composed of the time stamp 11a and frame number 11b, identifiers possessed by the header of the broadcasting contents information 10 shown in FIG. 2. Besides, the title ID 21b and keyword 21c are title ID 21d and keyword 21c possessed by the specified condition information 20 sent from the information utilization apparatus 3 and returned to the information utilization apparatus 3, and information used for extracting summary playback information 21a and additional screen information 21d in the information supply apparatus 2.

The viewer results information 22 includes a certification information 22a for certifying the viewer or the information utilization apparatus 3, a title ID 22b used for extracting the reproduced broadcasting contents summary information, a keyword 22c, and a selection information ID 22d. Such information results in indicating the reproduced summary contents and the viewer who has viewed them.

Now, the operation of the information supply system 1 system will be described using FIG. 1 to FIG. 3.

First, as a premise of broadcasting contents summary information supply, the information manipulation apparatus 5 creates the summary playback information 21a and additional screen information 21d.

As mentioned above, summary playback information 21a is an identifier possessed by the header 11. The information manipulation apparatus 5 receives broadcasting contents information 10 before broadcasting or broadcasted broadcasting contents information 10 by wired or radio reception, or physical distribution, selects the frame 12 composing the summary from the broadcasting contents information 10, extracts as identifier the time stamp 11a and the frame number 11b contained in the header 11 of that frames 12 and creates the summary playback information 21a by adding keywords or the like to them for search. Here, as a extraction method of time stamp 11a and frame number 11b, all of time stamps 11a and frame numbers 11b corresponding to individual frames 12 composing the summary may be extracted, and if frames 12 are successive, time stamps 11a and frame numbers 11b concerning the first frames 12 or the last frame 12 thereof may be extracted, and further, they may be extracted by a method mixing them. On the other hand, the additional screen information 21d is created in relation to the summary playback information 21a created as mentioned above, and composed of selection screen or the like for selecting in detail the summary contents indicated by the related summary playback information 21a.

Thus created summary playback information 21a and additional screen information 21d are transmitted to the summary playback information storing means 2d and the additional screen information storing means 2e of the information supply apparatus 2 and stored respectively.

On the other hand, the viewer checks the list of programs published in the newspaper or the like, or list of programs transmitted by the broadcasting station, and set to record programs the viewer want to view. Then, when the program set to be recorded is broadcasted, the broadcasting contents information 10 is received by a reception apparatus (not shown) of the viewer and stored in the broadcasting contents information storage means 3f in the information utilization apparatus 3. Here, the reception apparatus includes both embodiments, one built in, and integrated with the information utilization apparatus 3 or the other composed separately from the information utilization apparatus 3.

The viewer who wants to view the summary of the program set to be recorded, first, input the specified condition information 20 using the specified condition input means 3a. Here, the specified condition information 20 may well be input before or after storing the summary playback information 21a and additional screen information 21d in the information supply apparatus, and before or after storing broadcasting contents information 10 in the information utilization apparatus 3. Here, input items are distribution method which will be distribution method ID 20b, viewable time which will be viewable time information 20c, program title which will be title ID 20d, and keyword 20e. It is unnecessary to input the information concerning the certification information 20a, because it is uniquely decided by the viewer or information utilization apparatus 3, and it is also unnecessary to input the information concerning the selection information ID 20f, because it is performed according to the additional screen display mentioned below.

Thus input specified condition information 20 is sent to the specified condition information transmission means 3b and the specified condition information transmission means 3b transmits the input specified condition information 20 to the information supply apparatus 2 through the electronic communication means.

The transmitted specified condition information 20 is received by the specified condition reception means 2a, and specified condition reception means 2a certifies the specified condition information 20 using the certification information 20a of the specified condition information 20. The summary playback information search means 2c refers to the title ID 20d, keyword 20e and selection information 20f of the specified condition information 20 received by the specified condition reception means 2a, and extracts summary playback information 21a specified by them from the summary playback information storage means 2d. On the other hand, the summary contents shortening means 2b refers to the viewable time information 20c of the received specified condition information 20, and shortens the summary playback information 21a extracted by the summary playback information search means 2c. The summary playback information 21a is shortened so that the summary reproduced based on the summary playback information 21a is contained within the viewable time indicated in the viewable time information 20c and, to be more specific, it is performed by omitting or else the identifier of the summary playback information 21a corresponding to the frame to be thinned out, in order to thin out the frame composing the broadcasting contents summary information 21a. As a detailed method of thinning out, for instance, suppose the playback time of the summary to be reproduced based on the extracted summary playback information 21a be 1, the summary playback information of the shortening rate that will make the playback time 0.8, 0.6 and 0.4 times is created previously, and the summary playback information 21a that will be contained within the viewable time is selected among them. Then, thus shortened summary playback information 21a is sent to the summary playback distribution means 2g.

Also, the additional screen information extraction means 2f refers to the summary playback information 21a searched by the summary playback information search means 2c, and extracts the additional screen information 21d corresponding to the same from the additional screen information storage means 2e. Thus extracted additional screen information 21d is sent to the summary playback distribution means 2g.

The summary playback distribution means 2g that has received summary playback information 21a and additional screen information 21d sent from the summary contents shortening means 2b and the additional screen information extraction means 2f obtains tile ID 21b and keyword 21c of the specified condition information 20 received by the specified condition reception means 2a, composes the summary related information 21 with them, and at the same time, refers to the distribution method ID 20b of the specified condition information 20, and transmits the summary related information 21 according to the distribution method indicated by the same. The transmitted summary related information 21 is distributed to the information utilization apparatus 3 via the electronic communication means 5.

The distributed summary related information 21 is received by the summary related information reception means 3c and the received summary related information 21 is certified by the summary related information certification means 3d. Here, the certification means the operation to judge if the distributed summary related information 21 meets with the summary contents specified by the specified condition input means 3a, ant to be more specific, it is judged if title ID 21b and keyword 21c of the summary related information 21 agree with the title ID and keyword input by the specified condition input means 3a.

If it is judged that the received summary related information 21 meets with the summary contents, the additional screen display means 3e displays the search screen to input summary creation conditions or the like, using the additional screen information 21d of the summary related information 21. The search screen includes options to select more in detail the summary contents of be shown in the transmitted summary playback information 21a, and a new specified condition can be input by selecting conditions from these options. The condition selected from these options is input from the specified condition input means 3a, and thus input conditions are sent, again, from the specified condition transmission means 3b to the information supply apparatus 2 via the electronic communication means 5 as selection information ID 20f, with the other specified conditions input initially. Upon the reception of new specified condition information 20, the information supply apparatus 2 creates a new summary related information 21 using this new specified condition information 20, just as when the specified condition information 20 was transmitted for the first time. Thus created summary related information 21 reflects more in detail the request of the viewer than the one created for the first time, as it is created taking account of the contents of the selection information ID which is newly added specified condition. Thus created summary related information 21 is distributed to the information utilization apparatus 3 via the electronic communication means 4 as in the first case, and thereafter, it is certified by the summary related information certification means 3d, and again, the search screen is displayed by the additional screen display means 3e. This search screen displays options showing specified conditions more in detail than the first case, as it is created based on the additional screen information 21d of newly created summary related information 21. Thus, it becomes possible to input specified condition information 20 by restricting the specified range gradually, transmit and receive the summary related information 21 corresponding to this, by selecting the condition, sequentially according to the search screen displayed by the additional screen display means 3e.

When the specified conditions are restricted and confirmed in this way, or the specified conditions are confirmed without performing the restriction, the viewer indicates that the summary to be reproduced is confirmed, and upon this indication, the frame search means 3g extracts the frame composing the broadcasting contents summary information from the broadcasting contents information storage means 3f, using the summary playback information 21a of the newest summary related information 21. As mentioned above, as the summary playback information 21a is composed of time stamp 11a and frame number 11b possessed by he header 11 of the broadcasting contents information, the frame search means 3g can confirm the corresponding frame 12 by taking account of this summary playback information 21a, and extract the confirmed frame 12 from the broadcasting contents information 10 stored in the broadcasting contents information storage means 3f.

The frame 12 extracted by the frame search means 3g in this way, is reproduced by the image playback means 3h, and thus, the viewer can view the program summary corresponding to the specified condition.

When the summary is reproduced in this way, the viewing results information return means 3i replies that a particular summary has been reproduced to the information supply apparatus 2. This return is performed by transmitting the viewing results information 22 shown in FIG. 3(c) to the information supply apparatus 2 through the electronic communication means 4. The transmitted viewing results information 22 is received by the viewing results collection means 2h of the information supply apparatus 2, and the client management means creates viewing statistic information, statistics of the viewing results information based on the viewing results information 22 received by the viewing results collection means 2h and manages the client. Thus allows to collect the viewer's personal viewing information, supply service appropriate for respective viewer, and moreover, to create a program reflecting more the viewer taste, by supplying this information to the station.

To process the accounting of the use price of the information supply system 1 or the like, the accounting information transmission means 2j transmits the accounting information to the financial accounting institution 6 through the electronic communication means 4. Here, the accounting information is the date created based on the viewing statistic information managed by the client management means 2i, and includes data of respective viewer, and data or the like to confirm the use price charged to respective viewer, or others.

Also, as mentioned above, the advertisement information storage means 2k records various advertisement information, and the advertisement selection means 21 selects advertisement information from the advertisement information storage means 2k based on the viewing statistic information managed by the client management means 2i. Here, the advertisement information includes not only advertisement concerning the broadcasting contents broadcasted from the broadcasting station, but also information of communication address of the electronic communication network that can be connected using an the electronic communication apparatus, such as Internet home page address or the like. Advertisement information selected by the advertisement selection means 21 is transmitted to the information utilization apparatus 3 of respective viewer by the summary playback distribution means 2g through the electronic communication means 4. This allows to provide each individual with advertisement information appropriate for respective viewer's taste.

Now a concrete example of information supply system 1 will be described.

Figure 4:
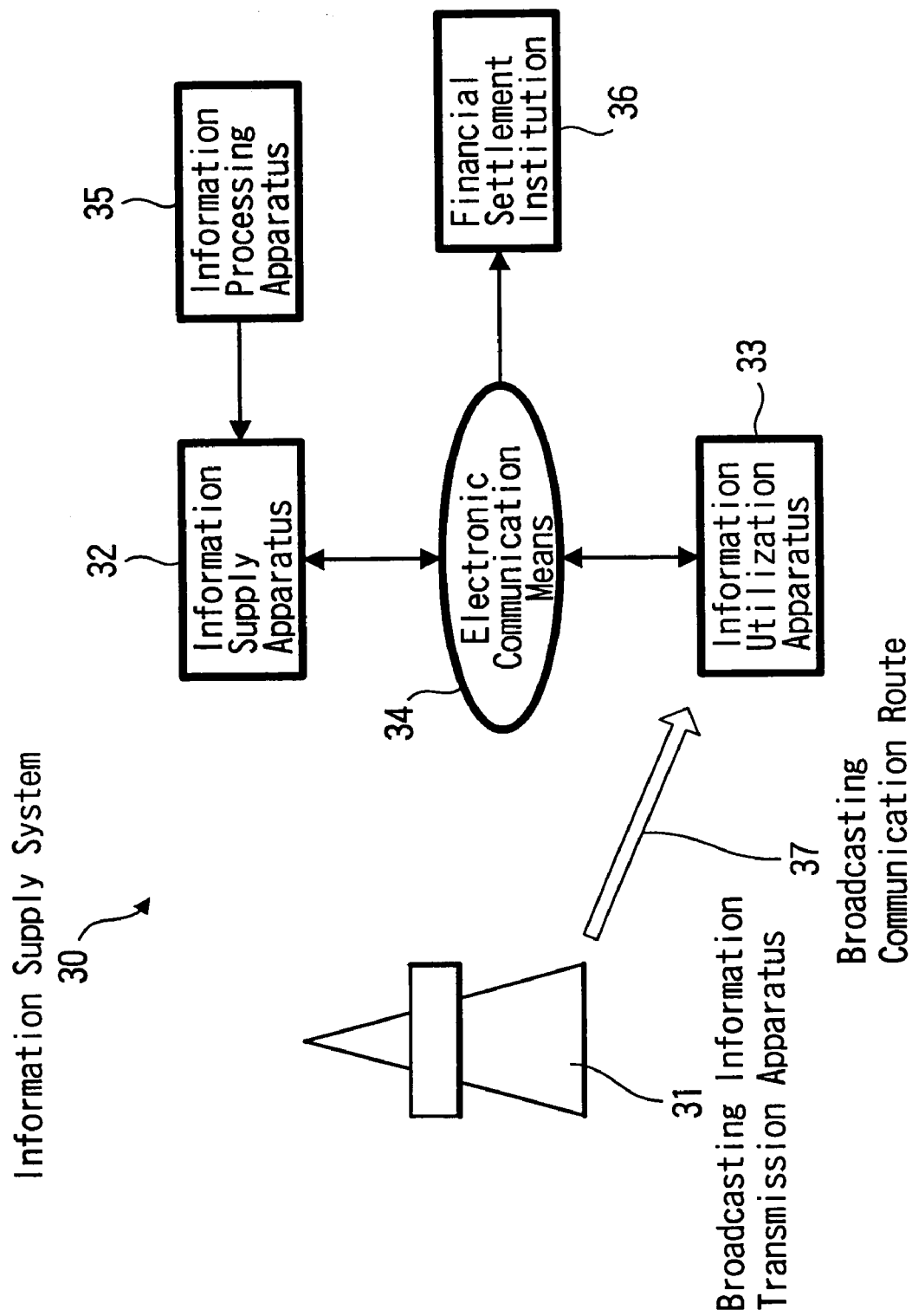
FIG. 4 is a composition diagram showing a detailed example of the information supply system.

FIG. 4 is a composition diagram showing the composition of an information supply system 30 which is a detailed example of the information supply system 1.

The information supply system 30 is composed of an information supply apparatus 32, an information utilization apparatus 33, an electronic communication means 34, an information manipulation apparatus 35 and a broadcasting information transmission apparatus 31 installed in the broadcasting station or the like to transmit the broadcasting contents information, and is connected to the financial accounting institution 36 through the electronic communication means 34. Here, the broadcasting contents information transmitted from the broadcasting information transmission apparatus 31 is transmitted to the broadcasting utilization apparatus 33 through a broadcasting communication route 37.

Figure 5:
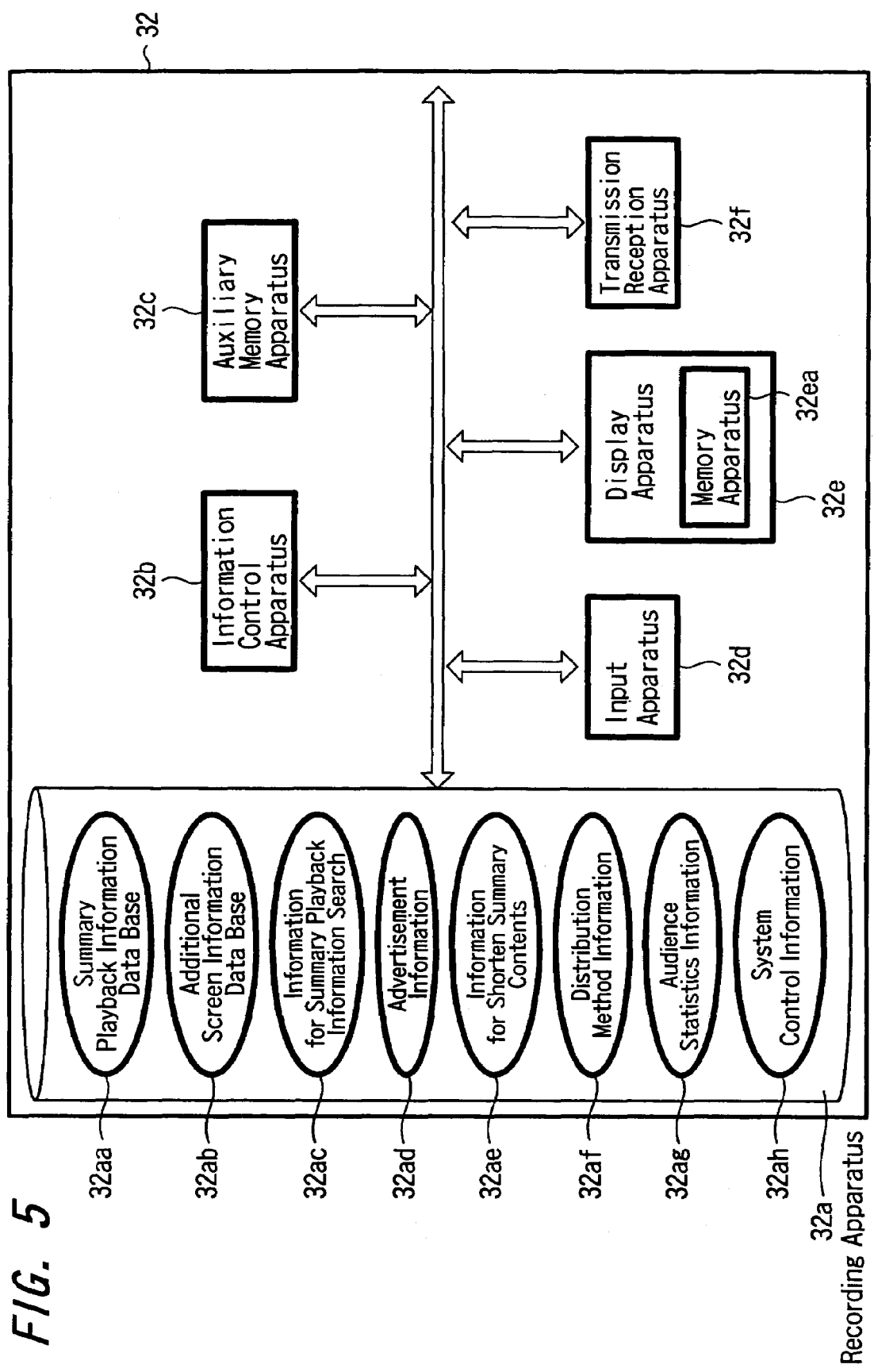
FIG. 5 is a composition diagram showing the composition of the information supply apparatus.

FIG. 5 is a composition diagram showing the composition of the information supply apparatus 32.

The information supply apparatus 32 is composed of a recording apparatus 32a which is semiconductor memory of the like such as RAM (random access memory) for recording various information, an information control apparatus 32b for controlling the whole information supply apparatus 32, an auxiliary memory apparatus 32c for recording information used for setting basic input/output of respective apparatus composing the information supply apparatus 32, an input apparatus 32d for inputting various information, a display apparatus 32e for displaying various information such as summary image or the like to be supplied, and a transmission reception apparatus 32f, connected to the electronic communication means 34 for transmitting/receiving information.

Here, the recording apparatus 32a stores summary playback information data base 32aa which is data base of summary playback information, additional screen information data base 32ab which is data base of additional screen information, summary playback information search information 32ac which is a search engine program for searching a particular summary playback information from the summary playback information data base 32aa, summary contents shortening information 32ae which is a program for shortening the summary playback information based on the specified viewable time information, distribution method information af specified by the viewer, viewing statistic information 32ag and system control information 32ah which is used for controlling the information supply apparatus 32.

On the other hand, the display apparatus 32e includes a memory apparatus 32ea recording bit map data images or the like displayed on the display apparatus 32e. The memory apparatus 32ea uses semiconductor memory or the like such as RAM or ROM (read only memory).

Figure 6:
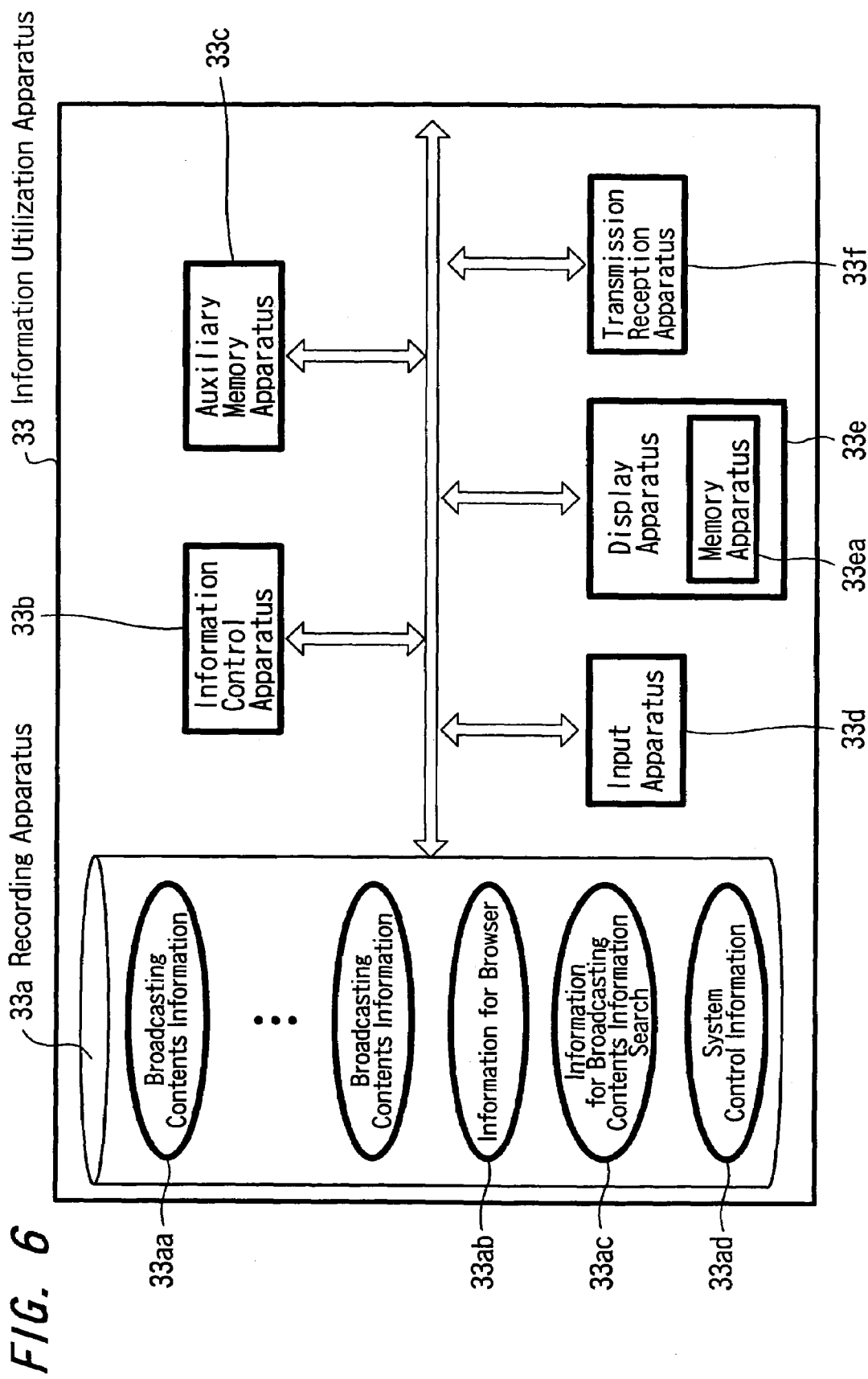
FIG. 6 is a composition diagram showing the composition of the information utilization apparatus.

FIG. 6 is a composition diagram showing the composition of an information utilization apparatus 33.

The information utilization apparatus 33 is composed of a recording apparatus 33a for recording various information, an information control apparatus 33b for controlling the whole information utilization apparatus 33, an auxiliary memory apparatus 33c recording information used for setting basic input/output of respective apparatus composing the information utilization apparatus 33, an input apparatus 33d for inputting various information such as specified conditions, a display apparatus 33e for displaying various information such as summary image or the like, and a transmission reception apparatus 33f, connected to the electronic communication means 34 for transmitting/receiving information.

Here, the recording apparatus 33a stores a plurality of broadcasting contents information transmitted from the broadcasting information transmission apparatus 31 through the broadcasting communication route 37 and downloaded by the information utilization apparatus 33, browser information 33ab which is a software used for reading the data group and extract information according to the object, broadcasting contents information search information 33ac which is a search engine program for searching a particular broadcasting contents information from the downloaded broadcasting contents information 33aa, and system control information 33ad which is used for controlling the information utilization apparatus 33.

In addition, the display apparatus 33e has a memory apparatus 33ea recording bit map data of image or the like displayed on the display apparatus 33e.

Figure 7:
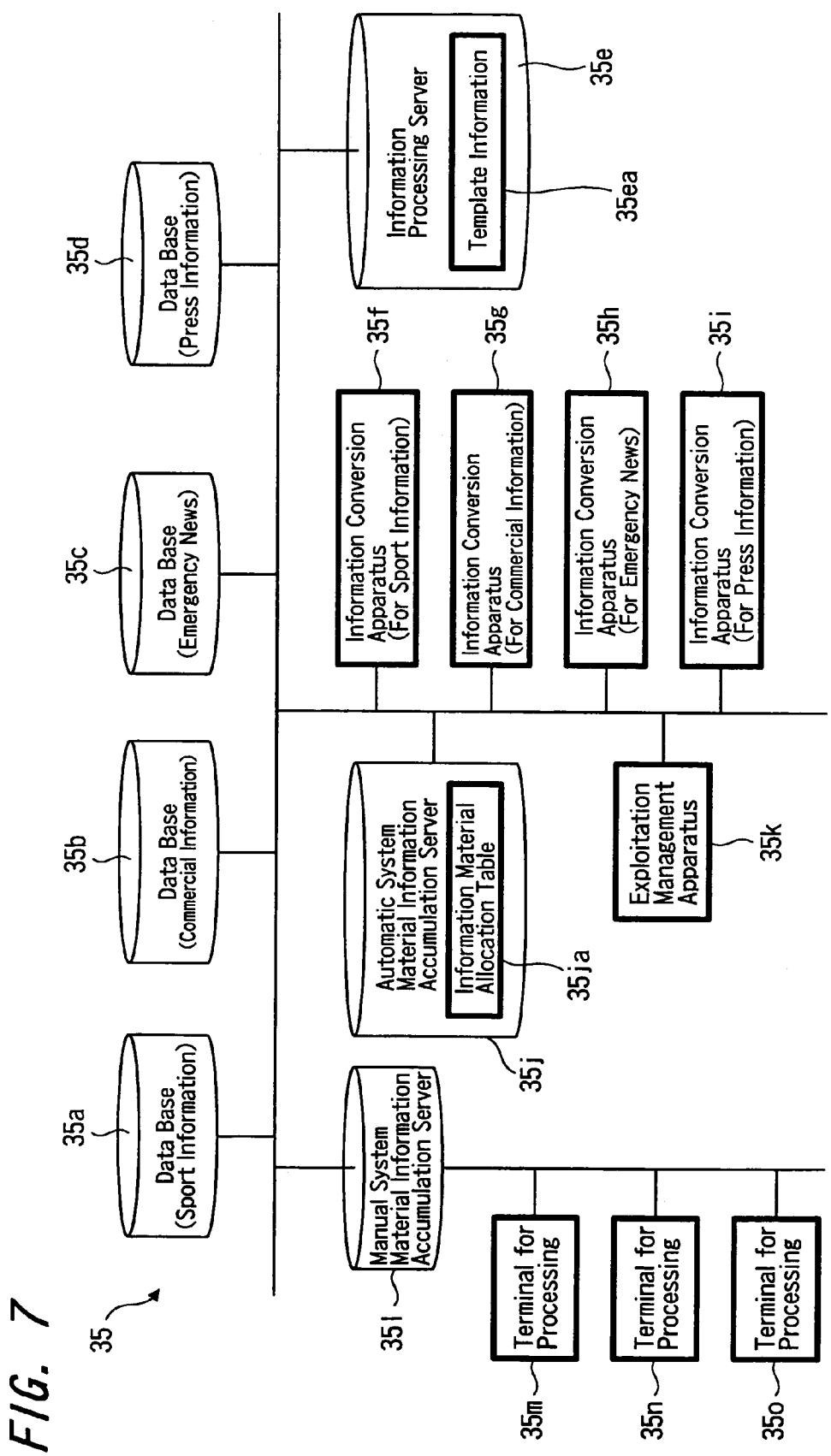
FIG. 7 is a composition diagram showing the composition of the information manipulation apparatus.

FIG. 7 is a composition diagram showing the composition of an information manipulation apparatus 35.

The information manipulation apparatus 35 comprises data base 34a–35d which is broadcasting contents information storage means for classifying the broadcasting contents information by broadcasting contents and storing, information processing server 35e storing template information 35ea for processing broadcasting contents information, automatic system material information accumulation server 35j which is material information accumulation server for extracting and dividing the broadcasting contents information stored in the data base 34a–35d and the template information stored in the information processing server 35e, information material allocation table 35ja for creating child screen of the broadcasting contents for each scene change of the broadcasting contents, information conversion apparatus 35f–35i which is information processing means for creating summary playback information, using broadcasting contents information divided by the means creates the summary playback information using the broadcasting contents information and the template information divided by the automatic system material information accumulation server 35j and template information 35ea, processing terminal 35m–35o to which the operator input manually to create summary playback information, manual system material information accumulation server 35l for extracting broadcasting contents information stored in the data base 35a–35d according to the input of processing terminal 35m–35o, and exploitation management apparatus 35k for managing the exploitation of the whole information manipulation apparatus 35.

Next, the operation of the information supply system 30 will be described using FIG. 4 to FIG. 7.

The information manipulation apparatus 35 classifies broadcasting contents information obtained by reception or the like by field and stores in the data base. In case of FIG. 7, broadcasting contents information concerning sport program is stored in a sport information data base 35a, broadcasting contents information concerning commercial program is stored in a commercial information data base 35b, broadcasting contents information concerning emergency news is stored in an emergency news information data base 35c, and broadcasting contents information concerning journalistic program is stored in a journalistic information data base 35d respectively.

The information manipulation apparatus 35 creates summary playback information using broadcasting contents information stored in the data base 35a–35d, and here, the broadcasting contents information can be divided into the one that can be processed into summary playback information by a uniform processing, and the other that can not, and their processing method of summary playback information is different for the one from the another.

If the broadcasting contents information can be processed uniformly, the automatic system material information accumulation server 35j extracts the broadcasting contents information from the data base 35a–35d, and allocates the extracted broadcasting contents information by field to information conversion apparatus 35f–35i. Here, the broadcasting contents information to be allocated at this time is a child screen of the broadcasting contents created by the information material allocation table 35ja for each scene change of the broadcasting contents. Also, at this moment, template information 35ea corresponding to respective broadcasting contents information is extracted form the information processing server 35e, and allocated similarly to the information conversion apparatus 35f–35i. Here, the template information 35ea means an image frame used for creating summary playback information from the broadcasting contents information. The information conversion apparatus 35f–35i to which broadcasting contents information and template information 35ea are allocated processed the broadcasting contents information using the template information 35ea, extracts the information identifier after processing, and adds keyword or the like to create the summary playback information.

On the other hand, if the broadcasting contents information can not be processed uniformly, manual system material information accumulation server 35l extracts the broadcasting contents information from the data base 35a–35d, the operator processes and inputs the extracted broadcasting contents information using the processing terminal 35m–35o, and similarly extracts the information identifier after the processing, and adds keyword or the like to create the summary playback information.

Next, the information manipulation apparatus 35 creates an additional screen information corresponding to the summary playback information created as mentioned above. The operator create the additional screen information using the processing terminal 35m–35o.

Summary playback information and additional screen information created like this are sent to the information supply apparatus 32 and stored in the recording apparatus 32a of the information supply apparatus 32 as summary playback information data base 32aa and additional screen information data base 32ab respectively.

On the other hand, the viewer sets the recording of the broadcasting contents information of the program desired to view using the information utilization apparatus 33. As mentioned above, the auxiliary memory apparatus 32c memorizes information for basic input/output of respective apparatus and, first, an information control apparatus 32b read outs this information from the auxiliary memory apparatus 32c for initial setting of the information utilization apparatus 33. Thereafter, the information control apparatus 32b loads a system control information 32ah from a recording apparatus 32a, allowing to set the recording of program broadcasting contents information. When the viewer sets the recording and a broadcasting information transmission apparatus 31 transmits the recording set program, this broadcasting contents information is received by a viewer's receiver not shown, through a broadcasting communication route 37, and recorded as broadcasting contents information 33aa in the recording apparatus 33a.

Figure 9:
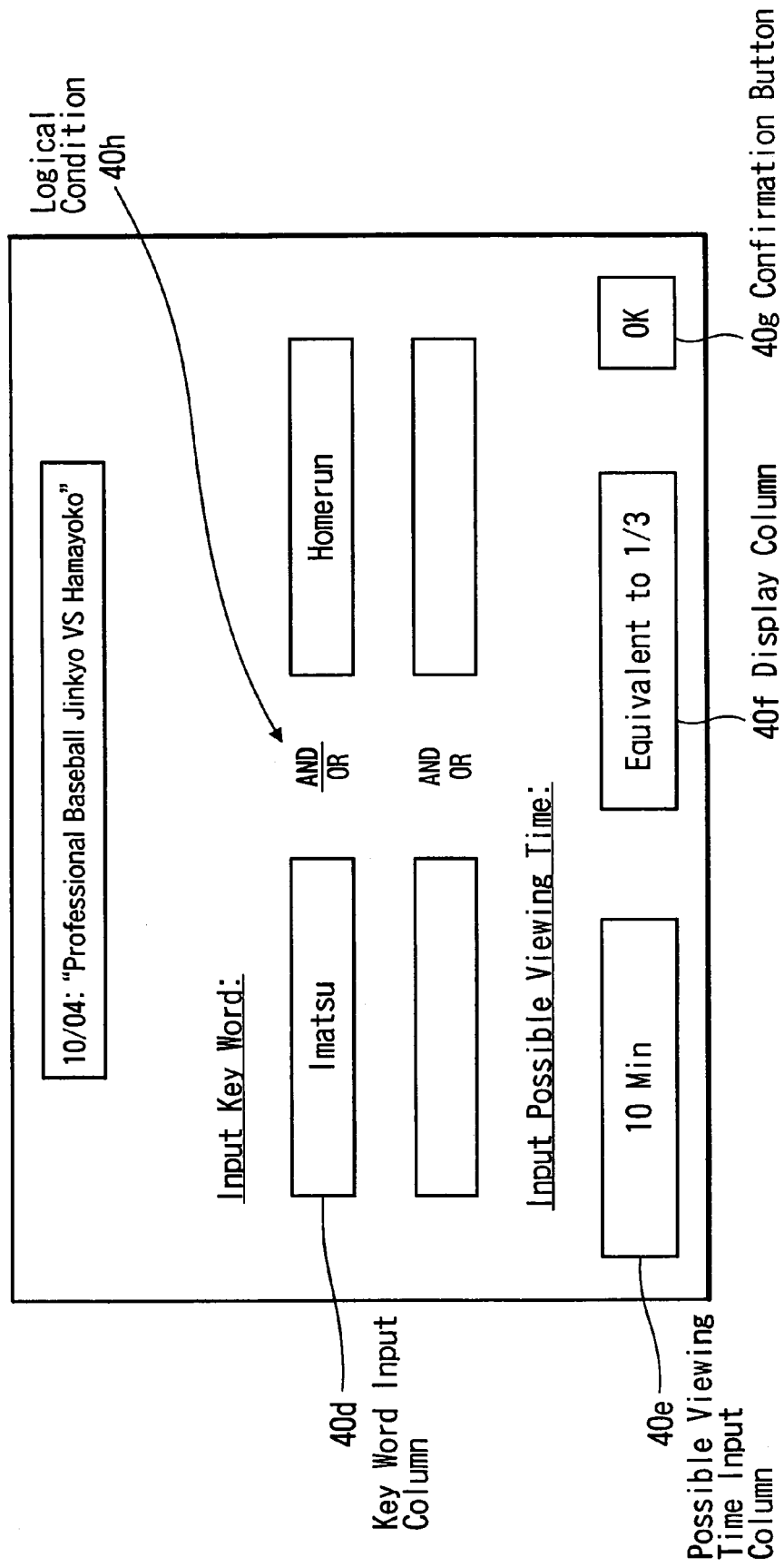
FIG. 9 is a display screen example displayed on the display apparatus when the specified condition information is input.

The viewer who wants to view the summary of a program set to be recorded, first, inputs the specified condition information using an input apparatus 33d according to the input screen displayed on the display apparatus 33e using a browser information 33ab. FIG. 8 and FIG. 9 are display examples displayed on the display apparatus 33e when the specified condition information is input.

FIG. 8 is a display screen of a program list set to be recorded, and a program whose summary is desired to view is selected by operating a scroll button 40c or the like. When it is desired to select a program among of displayed program options and to view the summary, a selection button 40b is clicked to confirm the selection button 40b. In the example of FIG. 8, the title "Professional baseball Jinkyo vs Hamayoko" is selected. On the other hand, for example, if a program of lower order than the displayed options exists, and this program of lower order is to be selected, a detail button 40a is clicked to display options of program of lower order, to decide the program among these options.

When the selection button 40b is clicked and the program is decided, next, a detail specified screen shown in FIG. 9 is displayed. The detail specified screen is provided with a keyword input column 40d for inputting a keyword to be used for creating the summary, a logical condition 40h composed of "AND", "OR" for deciding search conditions by a plurality of input keywords, and a viewable time input column 40e for inputting viewable time, and keywords and the viewable time are input and logical conditions are selected in these column. When the input is completed in this way, a display column 40f displays how long will be the input viewable time for the broadcasting time specified by keywords. In the example FIG. 9, "Imatsu" and "homerun" are input as keywords, "AND" showing that both conditions of keywords "Imatsu" and "homerun" are required as logical condition 40h is selected, and "10 min" is input as viewable time, and the display column 40f shows that the input viewable time is equivalent to one third of the broadcasting time specified by keywords. Then, if input items are to be checked and confirmed, a confirmation button 40g is clicked, to terminate the input of specified condition information. Though, in FIG. 9, input and selection are performed for all items of keyword input column 40d, logical condition 40h and viewable time input column 40e, it may composed not to input or select at least for one item. In this case, for the item not inputted or selected, the search will be performed without limitation.

Thus, the input specified condition information is sent to the information control apparatus 33b, and the information control apparatus 33b sends the transmitted specified condition information to the transmission/reception apparatus 33f, and the transmission/reception apparatus 33f sends the specified condition information to the information supply apparatus 32 through the electronic communication means 34.

The transmitted specified condition information is received by the transmission/reception apparatus 32f of the information supply apparatus 32, and the received specified condition information is sent to the information control apparatus 32b. The information control apparatus 32b which received the specified condition information certifies the specified condition information using the certification information of the specified condition information. When the authentication is terminated, the information control apparatus 32b extracts the summary playback information meeting with the transmitted specified condition information from the summary playback information data base 32aa, using the summary playback information search information 32ac recorded in the recording medium 32a. When the extraction of summary playback information is terminated, the information control apparatus 32b shortens the summary playback information extracted according to the specified condition information, using the summary contents shortening information 32ae recorded in the recording apparatus 32a. Also, the information control apparatus 32b extracts additional screen information corresponding to the extracted summary playback information from the additional screen information data base 32ab.

Thus, the extracted and shortened summary playback information and the additional screen information corresponding to the extracted and shortened summary playback information are distributed from the transmission/reception apparatus 32f to the information utilization apparatus 33 through the electronic communication means 34 with title ID and keyword contained in the specified condition information as summary related information. The distribution is performed by the information control apparatus 32b, using the distribution method information 32af stored in the recording apparatus 32a according to a method confirmed by the distribution method ID contained in the specified condition information.

The distributed summary related information is received by the transmission/reception apparatus 33f of the information utilization apparatus 33 and transmitted to the information control apparatus 33b. The information control apparatus 33b receives the summary related information and, first, certifies the sent summary related information. When the authentication is finished, the information control apparatus 33b displays the search screen of additional screen information contained in the summary related information on the display apparatus 33e using a browser information 33ab stored in the recording apparatus 33a. The search screen is displayed by creating search screen bit map data of the search screen in the recording apparatus 33ea using the browser information 33ab and the additional screen information, and reading out and scanning sequentially thus created bit map data.

Figure 10:
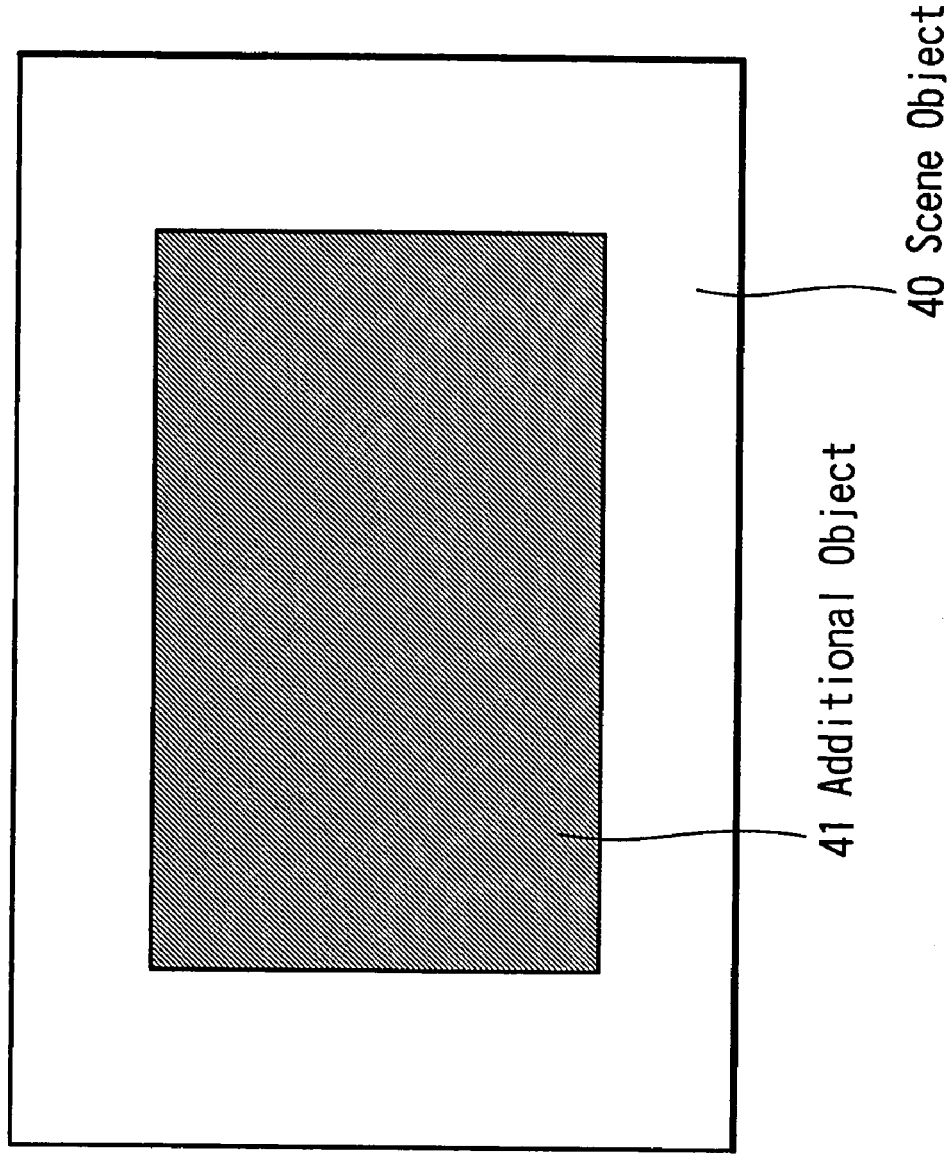
FIG. 10 is a schematic diagram showing the appearance of a search screen displayed on the display apparatus.

FIG. 10 is a schematic diagram showing the appearance of the search screen displayed on the display apparatus 33e.

As shown in FIG. 9, the search screen is composed of a scene object 40 as a background, and an additional object 41 displayed thereon. The scene object 40 is a screen displayed based on the data recorded inside the information utilization apparatus 33 beforehand, and selection buttons or the like common to the search screen is contained in this scene object 40. The additional object 41 is a screen created based on the transmitted additional screen information, and displays search information or the like corresponding to respective summary playback information.

Figure 11:
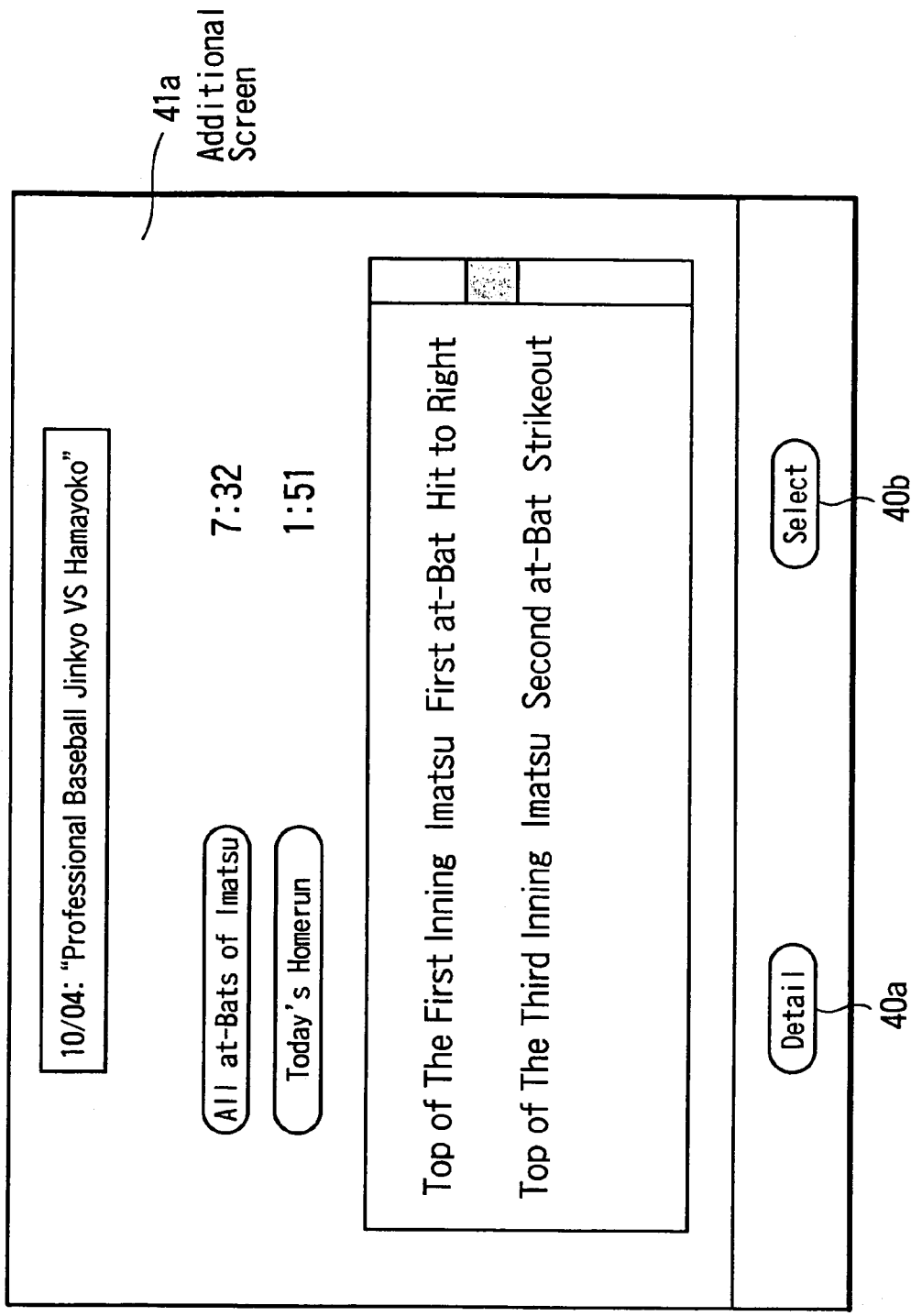
FIG. 11 is a display example of the search screen.

FIG. 11 is a display example of such displayed search screen.

In this screen, detail button 40 and selection button 40b are displayed as scene object 40, and an additional screen 41a as additional object 41 is superposed and displayed thereon. This additional screen 41a is displayed based on the additional screen information created by the specified condition information specified by conditions shown in FIG. 8 and FIG. 9, title "Professional baseball Jinkyo vs Hamayoko", keywords "Imatsu" and "homerun", viewable time "10 min.", and a plurality of options "all at-bats of Imatsu", "today's homerun" or others are displayed. The selection is made among these options, and the summary of the content thereof is desired to be supplied, the selection is performed by clicking the selection button 40b. On the other hand, if more detailed selection is to be performed, the selection button 40a is clicked. When the detail button 40a is pressed, this selection information is transmitted, again, to the information supply apparatus 32 as selection information ID of specified condition information, and upon the reception, the information supply apparatus 32 distributed summary related information corresponding to this specified condition information, and the information control apparatus 33b displays a new additional screen 41a using a newly received summary related information.

When the specified conditions are restricted and confirmed in this way, or the specified conditions are confirmed without performing the restriction, and the selection button 40b is clicked, the information control apparatus 33b extracts the frame composing the broadcasting contents summary information from the broadcasting contents information 33aa stored in the recording apparatus 33a according to the summary playback information, using the broadcasting contents summary information search information 33ac. The extracted frame is displayed and playback on the display apparatus 33e using a browser information 33ab.

When the summary is reproduced in this way, the information control apparatus 33b replies that a particular summary has been reproduced to the information supply apparatus 32. This return is performed by transmitting the viewing results information to the information supply apparatus 32 through the electronic communication means 34. The transmitted viewing results information is received by the transmission/reception apparatus 32f of the information supply apparatus 32 and sent to the information control apparatus 32b.

The information control apparatus 33b which receives viewing results information creates a viewing statistic information 32ag and stores in the recording apparatus 32a.

To process the accounting of the use price of the information supply system 30 or the like, the information control apparatus 32b transmits the accounting information to the financial accounting institution 36 through the electronic communication means 34. Also, the information control apparatus 32b selects advertisements to be transmitted to the viewer from the advertisement information 32b, based on the viewing statistic information 32ag stored in the recording apparatus 32ad.

Now, the information supply system operation will be described using the flow chart. FIG. 12 is a flow chart showing the operation of the information supply system 30.

[S1] Set to record the program referring the to the list of programs, receive the broadcasting contents information and, in the information utilization apparatus, store the received broadcasting contents information into the recording apparatus.

[S2] Specify the search conditions, and send the specified search conditions as the specified condition information to the information supply apparatus.

[S3] In the information supply apparatus, certify the specified condition information and confirm the distribution method.

[S4] Extract summary playback information and additional screen information by keyword search according to the specified condition information.

[S5] Refer to the viewable time possessed by the specified condition information, and shorten the summary playback information extracted in the step S4.

[S6] Transmit the summary playback information shortened in the step S5 and the additional screen information or the like extracted in the step S4 to the information utilization apparatus.

[S7] Update the browser screen by the additional screen information and display the additional screen.

[S8] Select to or not to perform a new search further in detail. If more detailed search is performed, proceed to the step S2. If a new search is not performed, proceed to the step S9.

[S9] In the information utilization apparatus, search broadcasting contents information necessary to replay the summary, referring to time stamp or the like, which is identifier contained in the received summary playback information.

[S10] Play back and display the broadcasting contents summary information, by the broadcasting contents information searched in the step 9.

[S11] After the playback of the summary, return the viewing results information to the information supply apparatus.

[S12] In the information supply apparatus, create a viewing results statistics based on the returned viewing results information.

[S13] Send the accounting information created based on the viewing statistics to the financial accounting institution, and process the accounting of use price or the like of the information supply system via the financial accounting institution.

[S14] Select advertisement information by individual based on the viewing statistics and distribute advertisement information by individual.

[S15] The viewer views the advertisement information.

Thus, in this embodiment, as the information supply method comprises the steps of storing summary playback information storage means representing summary contents of the broadcasting contents information, storing additional screen information created in correspondence to the summary playback information, extracting the specific summary playback information according to a transmitted specified condition information, extracting the additional screen information corresponding to the extracted summary playback information extracted, shortening the extracted summary playback information according to the specified condition information, and distributing the extracted additional screen information and the shortened summary playback information at a timing specified by the specified condition information, and the information utilization method, comprises the steps of storing the broadcasting contents information, inputting the specified condition information of the broadcasting contents information desired to be supplied, transmitting the specified condition information, receiving the distributed summary playback information and the additional screen information, displaying the additional screen, using the received additional screen information, extracting a frame composing the broadcasting contents information, from the stored broadcasting contents information, using the received summary playback information, and reproducing extracted frame, the recorded program contents can be recognized in a short period of time, and the selection of programs to view can be facilitated.

Also, in this embodiment, the viewing results information indicating that the summary of broadcasted contents has been reproduced by the information utilization apparatus is sent from the information utilization apparatus to the information supply apparatus, and the information supply apparatus collects this viewing results information, therefore, it becomes possible to collect personal information of viewer viewing the program, to supply services to various individuals, and collect the taste information of viewers.

The processing functions can be realized by a computer. In this case, the processing contents that the information supply apparatus and the information utilization apparatus should have are described in a program recorded in a computer readable recording medium. The aforementioned processing can be realized by a computer by executing this program on the computer. The readable recording medium in computer include magnetic recording apparatus, semiconductor memory, or the like. To diffuse in the market, it is also possible to store the program in a portable recording medium such as CD-ROM (Compact Disk Read Only Memory) or floppy disk, and diffuse the same, or to store in a recording apparatus of a computer connected via a network, and to transfer to the other computer through the network. To execute on a computer, the program is stored in a hard disk or the like in the computer and loaded on a main memory to execute. Here, the computer is not limited to a personal computer, but means the computer in general, having at least one processing unit and controlled by the program.

As mentioned above, as the information supply apparatus of the present invention stores summary playback information representing summary contents of the broadcasting contents information by the summary playback information storage means, stores additional screen information created in correspondence to the summary playback information by the additional screen information storage means for storing, extracts the specific summary playback information from the summary playback information storage means according to a transmitted specified condition information by the summary playback information search means for extracting, extracts the additional screen information corresponding to the summary playback information extracted by the summary playback information search means, from the additional screen information storage means by the additional screen information extraction means for extracting, shortens the summary playback information extracted by the summary playback information search means according to the specified condition information by summary contents shortening means, and distributes the additional screen information extracted by the additional screen information storage means, and the summary playback information shortened by the summary contents shortening means at a timing specified by the specified condition information by the summary playback distribution means, the recorded program contents can be recognized in a short period of time, and the selection of programs to view can be facilitated.

In addition, as the information supply apparatus of the present invention collects viewing results information indicating that the summary of broadcasted contents has been reproduced by the viewing results collection means, and creates viewing statistic information, statistics of the viewing results information, and manages the client by the client management means, the personal information of the viewer who watches the program can be collected.

Besides, as the information utilization apparatus of the present invention stores the broadcasting contents information by the broadcasting contents information storage means, inputs specified condition information of the broadcasting contents information desired to be supplied by the specified condition input means, transmits the specified condition information by the specified condition information transmission means, receives summary playback information representing the summary of the broadcasting contents information distributed according to the specified condition information by the summary related information reception means, displays the additional screen, using the additional screen information received by the summary related information reception means by the additional screen display means, by the frame search means for extracting a frame composing the broadcasting contents information, from the broadcasting contents information stored in the broadcasting contents information storage means, using the summary playback information received by the summary related information reception means, and reproduces the frame extracted by the frame search means by the image playback means, the recorded program contents can be recognized in a short period of time, and the selection of programs to view can be facilitated.

In addition, as the information utilization apparatus returns the viewing results information indicating that the broadcasting contents summary information is reproduced by the image playback means to the supplier of the broadcasting contents summary information by the viewing results information return means, the personal information of the viewer who watches the program can be collected.

Further, as information manipulation apparatus of the present invention stores the broadcasting contents information classified by broadcasting contents by the broadcasting contents information storage means, stores template information for processing the broadcasting contents information by the information processing server, extracts and divides the broadcasting contents information stored in the broadcasting contents information storage means and the template information stored in the information processing server by the material information accumulation server, and creates the summary playback information using the broadcasting contents information and the template information divided by the material information accumulation server by the information processing means, the summary of the program contents can be supplied and the recorded program contents can be recognized in a short period of time.

Also, as the information supply system stores summary playback information representing summary contents of the broadcasting contents information by the summary playback information storage means, stores additional screen information created in correspondence to the summary playback information by the additional screen information storage means, extracts the specific summary playback information from the summary playback information storage means according to a transmitted specified condition information by the summary playback information search means, extracts the additional screen information corresponding to the summary playback information extracted by the summary playback information search means, from the additional screen information storage means by the additional screen information extraction means, shortens the summary playback information extracted by the summary playback information search means according to the specified condition information by the summary contents shortening means, distributes the additional screen information extracted by the additional screen information storage means, and the summary playback information shortened by the summary contents shortening means at a timing specified by the specified condition information by the summary playback distribution means, stores the broadcasting contents information by the broadcasting contents information storage means, inputs specified condition information of the broadcasting contents information desired to be supplied by the specified condition input means, transmits the specified condition information by the specified condition information transmission means, receives summary playback information representing the summary of the broadcasting contents information distributed according to the specified condition information by the summary related information reception means, displays the additional screen, using the additional screen information received by the summary related information reception means by the additional screen display means, extracts a frame composing the broadcasting contents information, from the broadcasting contents information stored in the broadcasting contents information storage means, using the summary playback information received by the summary related information reception means by the frame search means, and replays the frame extracted by the frame search means by the image playback means, the recorded program contents can be recognized in a short period of time, and the selection of programs to view can be facilitated.

Further, as the information supply method of the present invention comprises the steps of storing summary playback information storage means representing summary contents of the broadcasting contents information, storing additional screen information created in correspondence to the summary playback information, extracting the specific summary playback information according to a transmitted specified condition information, extracting the additional screen information corresponding to the extracted summary playback information extracted, shortening the extracted summary playback information according to the specified condition information, and distributing the extracted additional screen information and the shortened summary playback information at a timing specified by the specified condition information, the recorded program contents can be recognized in a short period of time, and the selection of programs to view can be facilitated.

In addition, as the information utilization method of the present invention comprises the steps of storing the broadcasting contents information, inputting the specified condition information of the broadcasting contents information desired to be supplied, transmitting the specified condition information, receiving the distributed summary playback information and the additional screen information, displaying the additional screen, using the received additional screen information, extracting a frame composing the broadcasting contents information, from the stored broadcasting contents information, using the received summary playback information, and reproducing the extracted frame, the recorded program contents can be recognized in a short period of time, and the selection of programs to view can be facilitated.

Further, as the recording medium of the present invention stores the program to perform by a computer functions of storing summary playback information storage means representing summary contents of broadcasting contents information, storing additional screen information created in correspondence to the summary playback information, extracting the specific summary playback information according to the transmitted specified condition information, extracting the additional screen information corresponding to the extracted summary playback information extracted, shortening the extracted summary playback information according to the specified condition information, and distributing the extracted additional screen information and the shortened summary playback information at a timing specified by the specified condition information, the recorded program contents can be recognized in a short period of time, and the selection of programs to view can be facilitated, by executing the program stored in the recording medium by a computer.

Moreover, as the recording medium of the present invention stores the program to perform by a computer functions of storing broadcasting contents information, inputting the specified condition information of the broadcasting contents information desired to be supplied, transmitting the specified condition information, receiving the distributed summary playback information and the additional screen information, displaying the additional screen, using the received additional screen information, extracting a frame composing the broadcasting contents information, from the stored broadcasting contents information, using the received summary playback information, and reproducing the extracted frame, the recorded program contents can be recognized in a short period of time, and the selection of programs to view can be facilitated, by making a computer execute the program stored in this recording medium.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An information supply apparatus for providing to a user broadcasting contents summary information obtained by summarizing the broadcasting contents information, comprising:

user authentication means for receiving authentication information and authenticating the user of the broadcasting contents summary information;

summary playback information storage means for storing summary playback information representing summary contents of said broadcasting contents information, said broadcasting contents information being processed into said summary playback information in one of two ways, wherein, in a first way, said summary playback information is automatically extracted from said broadcasting contents information when said broadcasting contents information can be uniformly processed, wherein said first way extracts broadcasting contents information from a database and allocates the extracted broadcasting contents information by field using a template, wherein, in a second way, said summary playback information is obtained by an operator by extracting an information identifier from said broadcasting contents information, and manually adding keywords when said broadcasting contents information cannot be uniformly processed, wherein a logical condition for deciding search conditions by a plurality of input keywords is selected, and wherein said broadcasting contents information is processed to generate a child screen for each scene change of said broadcasting contents information;

additional screen information storage means for storing additional screen information created in correspondence to said summary playback information;

summary playback information search means for extracting said specific summary playback information from said summary playback information storage means according to a transmitted specified condition information;

additional screen information extraction means for extracting said additional screen information corresponding to said summary playback information extracted by said summary playback information search means from said additional screen information storage means;

summary contents shortening means for compressing said summary playback information extracted by said summary playback information search means according to said specified condition information; and summary playback distribution means for distributing said additional screen information extracted by said additional screen information storage means and said summary playback information shortened by said summary contents shortening means at a timing specified by said specified condition information.

2. The information supply apparatus of claim 1, wherein said summary playback information includes an identifier indicating the frame number of a frame composing said broadcasting contents summary information and the broadcasting time when the frame has been broadcasted.

3. The information supply apparatus of claim 1, wherein said specified condition information includes a keyword specified by a user, a title ID specifying broadcasting unit, and selected information ID indicating summary contents selected by the user; and said summary playback information search means extracts said summary playback information according to said keyword, said title ID and said selected information ID included in said specified condition information.

4. The information supply apparatus of claim 3, wherein said summary playback distribution means distributes said keyword, said title ID and said selected information ID included in said specified condition information as well as said additional screen information and said summary playback information.

5. The information supply apparatus of claim 1, wherein said specified condition information includes information about viewable time specified by a user; and said summary contents shortening means shortens said summary playback information so that the summary of broadcasted contents to be created can be contained within said viewable time.

6. The information supply apparatus of claim 1, wherein said specified condition information includes a distribution method ID indicating a distribution method indicated by a user, and said summary playback distribution means distributes said summary playback information according to said distribution method ID.

7. The information supply apparatus of claim 6, wherein said distribution method ID indicates a timing for distributing said additional screen information and said summary playback information selected from any of a time of transmission of said specified condition information, a daily predetermined time, and distributable time.

8. The information supply apparatus of claim 1, further comprising:

viewing results collection means for collecting viewing results information indicating that the summary of broadcasted contents has been reproduced, and client management means for creating viewing statistic information which is statistics of said viewing results information to manage the client.

9. The information supply apparatus of claim 8, further comprising: accounting information transmission means for transmitting accounting information to a financial settlement institution.

10. The information supply apparatus of claim 8, further comprising: advertisement information storage means for storing advertisement information to be supplied to a user; and advertisement selection means for extracting personal advertisement information selected for each user from said advertisement information storage means on the basis of the viewers statistic information; and wherein said summary playback distribution means distributes said personal advertisement information.

11. The information supply apparatus of claim 10, wherein said advertisement information includes a communication address of electronic communication network connectable by using an electronic communication apparatus.

12. An information utilization apparatus for enabling a user to use broadcasting contents summary information obtained by summarizing the broadcasting contents information, comprising:

user authentication means for receiving authentication information and authenticating the user of the broadcasting contents summary information;

broadcasting contents information storage means for storing said broadcasting contents information;

specified condition input means for inputting specified condition information of said broadcasting contents information desired to be supplied;

specified condition information transmission means for transmitting said specified condition information;

summary related information reception means for receiving summary playback information representing the summary of said broadcasting contents information distributed according to said specified condition information and additional screen information corresponding to the summary playback information, said broadcasting contents information being processed into said summary playback information in one of two ways, wherein, in a first way, said summary playback information is automatically extracted from said broadcasting contents information when said broadcasting contents information can be uniformly processed, wherein said first way extracts broadcasting contents information from a database and allocates the extracted broadcasting contents information by field using a template, wherein, in a second way, said summary playback information is obtained by an operator by extracting an information identifier from said broadcasting contents information, and manually adding keywords when said broadcasting contents information cannot be uniformly processed, wherein a logical condition for deciding search conditions by a plurality of input keywords is selected, and wherein said broadcasting contents information is processed to generate a child screen for each scene change of said broadcasting contents information;

additional screen display means for displaying the additional screen, using said additional screen information received by said summary related information reception means;

frame search means for extracting a frame composing said broadcasting contents information from said broadcasting contents information stored in said broadcasting contents information storage means, using said summary playback information received by said summary related information reception means; and image playback means for reproducing said frame extracted by said frame search means.

13. The information utilization apparatus of claim 12, wherein said summary playback information includes an identifier indicating the frame number of a frame composing said broadcasting contents summary information and the broadcasting time when the frame has been broadcasted.

14. The information utilization apparatus of claim 12, wherein said specified condition information includes a keyword, a title ID specifying the broadcasting unit, a selected information ID indicating the summary contents, viewable time information and distribution method ID indicating the distribution method.

15. The information utilization apparatus of claim 14, wherein said distribution method ID indicates a timing for distributing said additional screen information and said summary playback information selected from any of a time of transmission said specified condition information, a daily predetermined time and a distributable time.

16. The information utilization apparatus of claim 12, wherein said summary related information reception means receives said keyword specifying said additional screen information and said summary playback information, said title and said selection information ID distributed with said additional screen information and said summary playback information; and further comprising:

summary related information certification means for authenticating received said additional screen information and said summary playback information, using said keyword, said title and said selection information ID received by said summary related information reception means.

17. The information utilization apparatus of claim 12, wherein said summary related information reception means receives supplied personal advertisement information.

18. The information utilization apparatus of claim 17, wherein said personal advertisement information includes a communication address of electronic communication network connectable by using an electronic communication apparatus.

19. The information utilization apparatus of claim 12, further comprising:

viewing results information return means for returning viewing results information indicating that said broadcasting contents summary information is reproduced by said image playback means to the supplier of said broadcasting contents summary information.

20. The information utilization apparatus claim 12, wherein said specified condition input means can input said specified condition information according to the display of said additional screen and gradually restricting the specified range.

21. An information manipulation apparatus for creating for a user summary playback information showing the summary contents of broadcasting contents information, comprising:

user authentication means for receiving authentication information and authenticating the user of the broadcasting contents summary information;

broadcasting contents information storage means for storing said broadcasting contents information classified by broadcasting contents; information processing server for storing template information for processing said broadcasting contents information;

material information accumulation server for extracting and dividing said broadcasting contents information stored in said broadcasting contents information storage means and said template information stored in said information processing server, said material information accumulation server operating to generate child screen of said broadcasting contents for each scene change of said broadcasting contents; and information processing means for creating said summary playback information using said broadcasting contents information and said template information divided by said material information accumulation server, said broadcasting contents information being processed into said summary playback information in one of two ways, wherein, in a first way, said summary playback information is automatically extracted from said broadcasting contents information when said broadcasting contents information can be uniformly processed, wherein said first way extracts broadcasting contents information from a database and allocates the extracted broadcasting contents information by field using a template, and wherein, in a second way, said summary playback information is obtained by an operator by extracting an information identifier from said broadcasting contents information, and manually adding keywords when said broadcasting contents information cannot be uniformly processed, wherein a logical condition for deciding search conditions by a plurality of input keywords is selected.

22. An information supply system for supplying to a user broadcasting contents summary information obtained by summarizing the broadcasting contents information, including:

user authentication means for receiving authentication information and authenticating the user of the broadcasting contents summary information;

information supply apparatus comprising summary playback information storage means for staring summary playback information representing summary contents of said broadcasting contents information, additional screen information storage means for storing additional screen information created in correspondence to said summary playback information, summary playback information search means for extracting said specific summary playback information from said summary playback information storage means according to a transmitted specified condition information, additional screen information extraction means for extracting said additional screen information corresponding to said summary playback Information extracted by said summary playback information search means from said additional screen information storage means, summary contents shortening means for compressing said summery playback information extracted by said summary playback information search means according to said specified condition information and summary playback distribution means for distributing said additional screen information extracted by said additional screen information storage means and said summary playback information shortened by said summary contents shortening means at a timing specified by said specified condition information, said broadcasting contents information being processed into said summary playback information in one of two ways, wherein, in a first way, said summary playback information is automatically extracted from said broadcasting contents information when said broadcasting contents information can be uniformly processed, wherein said first way extracts broadcasting contents information from a database and allocates the extracted broadcasting contents information by field using a template, wherein, in a second way, said summary playback information is obtained by an operator by extracting an information identifier from said broadcasting contents information, and manually adding keywords when said broadcasting contents information cannot be unifonnly processed, wherein a logical condition for deciding search conditions by a plurality of input keywords is selected, and wherein said broadcasting contents information is processed to generate a child screen for each scene change of said broadcasting contents information; and information utilization apparatus, comprising broadcasting contents information storage means for storing said broadcasting contents information, specified condition input means for inputting specified condition information of said broadcasting contents information desired to be supplied, specified condition information transmission means for transmitting said specified condition information, summary related information reception means for receiving summary playback information representing the summary of said broadcasting contents information distributed according to said specified condition information, additional screen display means for displaying the additional screen, using said additional screen information received by said summary related information reception means, frame search means for extracting a frame composing said broadcasting contents information from said broadcasting contents information stored in said broadcasting contents information storage means, using said summary playback information received by said summary related information reception means, image playback means for reproducing said frame extracted by said frame search means.

23. The information supply system of claim 22, wherein said information utilization apparatus further comprises viewing results information return means for returning the viewing results information indicating that said broadcasting contents summary information is reproduced by said image playback means, and said information supply apparatus further comprises an viewing results collection means for collecting said viewing results information and a client management means for creating viewing statistic information which is statistics of said viewing results information to manage the client.

24. The information supply system of claim 22, further comprising an information manipulation apparatus including broadcasting contents information storage means for storing said broadcasting contents information classified by broadcasting contents, a information processing server for storing template information for processing said broadcasting contents information, a material information accumulation server for extracting and dividing said broadcasting contents information stored in said broadcasting contents information storage means and said template information stored in said information processing server, and information processing means for creating said summary playback information using said broadcasting contents information and said template information divided by said material information accumulation server.

25. An information supply method for supplying to a user broadcasting contents summary information obtained by summarizing the broadcasting contents information, comprising the steps of:

receiving authentication information and authenticating the user of the broadcasting contents summary inflation;

storing summary playback information storage means representing summary contents of said broadcasting contents information, said broadcasting contents information being processed into said summary playback information in one of two ways, wherein, in a first way, said summary playback information is automatically extracted from said broadcasting contents information when said broadcasting contents information can be uniformly processed, wherein said first way extracts broadcasting contents inflation from a database and allocates the extracted broadcasting contents information by field using a template, wherein, in a second way, said summary playback information is obtained by an operator by extracting an information identifier from said broadcasting contents information, and manually adding keywords when said broadcasting contents information cannot be uniformly processed, wherein a logical condition for deciding search conditions by a plurality of input keywords is selected, and wherein said broadcasting contents information is processed to generate a child screen for each scene change of said broadcasting contents information;

storing additional screen information created in correspondence to said summary playback information; extracting specific summary playback information according to a transmitted specified condition information;

extracting said additional screen information corresponding to said extracted summary playback inflation;

shortening said extracted summary playback information according to said specified condition information; and distributing said extracted additional screen information and said shortened summary playback information at a timing specified by said specified condition information.

26. An information utilization method for enabling a user to use broadcasting contents summary information obtained by summarizing the broadcasting contents information, comprising steps of:

receiving authentication information and authenticating the user of the broadcasting contents summary information;

storing said broadcasting contents information;

inputting said specified condition information of said broadcasting contents inflation desired to be supplied;

transmitting said specified condition information;

receiving said summary playback information and said additional screen information distributed, said broadcasting contents information being processed into said summary playback information in one of two ways, wherein, in a first way, said summary playback information is automatically extracted from said broadcasting contents information when said broadcasting contents information can be uniformly processed, wherein said first way extracts broadcasting contents information from a database and allocates the extracted broadcasting contents information by field using a template, wherein, in a second way, said summary playback information is obtained by an operator by extracting an information identifier from said broadcasting contents information, and manually adding keywords when said broadcasting contents information cannot be uniformly processed, wherein a logical condition for deciding search conditions by a plurality of input keywords is selected, and wherein said broadcasting contents information is processed to generate a child screen for each scene change of said broadcasting contents information;

displaying the additional screen, using received said additional screen information;

extracting a frame composing said broadcasting contents information, from said broadcasting contents information stored, using received said summary playback information; and reproducing said extracted frame.

27. The information utilization method of claim 26, wherein said specified condition information is input and transmitted, and said summary playback information and said additional screen information are received according to the display of said additional screen while gradually restricting a specified range.

* * * * *